United States Patent
Li et al.

(10) Patent No.: US 12,023,641 B2
(45) Date of Patent: Jul. 2, 2024

(54) COMPOSITION COMPRISING SELF-STRATIFYING AMPHIPHILIC JANUS PARTICLES

(71) Applicant: Iowa State University Research Foundation, Inc., Ames, IA (US)

(72) Inventors: Yifan Li, Ames, IA (US); Shan Jiang, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 18/150,054

(22) Filed: Jan. 4, 2023

(65) Prior Publication Data
US 2023/0142857 A1    May 11, 2023

Related U.S. Application Data

(63) Continuation of application No. 17/320,716, filed on May 14, 2021, now Pat. No. 11,612,871.

(60) Provisional application No. 63/027,193, filed on May 19, 2020.

(51) Int. Cl.
| | |
|---|---|
| B01J 13/16 | (2006.01) |
| B01J 13/04 | (2006.01) |
| B82Y 30/00 | (2011.01) |
| B82Y 40/00 | (2011.01) |
| C08F 2/22 | (2006.01) |
| C08L 25/06 | (2006.01) |
| C08L 31/04 | (2006.01) |

(52) U.S. Cl.
CPC ............. *B01J 13/16* (2013.01); *B01J 13/043* (2013.01); *C08F 2/22* (2013.01); *C08L 25/06* (2013.01); *C08L 31/04* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 11,612,871 B2 | 3/2023 | Li et al. | |
| 2008/0242774 A1 | 10/2008 | Lahann et al. | |
| 2015/0344712 A1* | 12/2015 | Harrison | C09D 11/322 |
| | | | 428/206 |
| 2021/0362117 A1 | 11/2021 | Li et al. | |

OTHER PUBLICATIONS

"U.S. Appl. No. 17/320,716, Non Final Office Action mailed Sep. 22, 2022", 9 pgs.
"U.S. Appl. No. 17/320,716, Notice of Allowance mailed Nov. 25, 2022", 8 pgs.
"U.S. Appl. No. 17/320,716, Response filed Nov. 10, 2022 to Non Final Office Action mailed Sep. 22, 2022", 9 pgs.

(Continued)

*Primary Examiner* — Jeffrey D Washville
(74) *Attorney, Agent, or Firm* — Schwegman Lundberg & Woessner, P.A.

(57) ABSTRACT

The disclosure relates to a composition comprising amphiphilic Janus particles and a waterborne binder, wherein the particles are self-stratified, and methods of making and using the same. The disclosure also relates to the synthesis of amphiphilic Janus particles.

20 Claims, 22 Drawing Sheets

(56) References Cited

OTHER PUBLICATIONS

Atmuri, A. K., et al., "Autostratification in drying colloidal dispersions: effect of particle interactions", Langmuir, 28(5), (2012), 2652-2658.

Beaugendre, A., et al., "Self-stratifying coatings: A review", Progress in Organic Coatings, 110, (2017), 210-241.

Berger, S., et al., "Engineering of Ultra-Hydrophobic Functional Coatings Using Controlled Aggregation of Bicomponent Core/Shell Janus Particles", Adv. Funct. Mater., 21, (2011), 2338-2344.

Cao, Z., et al., "Light-Responsive Janus-Particle-Based Coatings for Cell Capture and Release", ACS Macro Lett., 6, (2017), 1124-1128.

Carr, Amanda J., et al., "Evidence of Stratification in Binary Colloidal Films from Microbeam X-ray Scattering: Toward Optimizing the Evaporative Assembly Processes for Coatings", ACS Applied Nano Materials, 1(8), (2018), 4211-4217.

Chen, Q., et al., "Supracolloidal Reaction Kinetics of Janus Spheres", Science, 331(6014), (2011), 199-202.

Du, Y. Joshua, et al., "Inorganic/organic hybrid coatings for aircraft aluminum alloy substrates", Progress in Organic Coatings, 41(4), (May 2002), 226-232.

Feng, L., et al., "Super-Hydrophobic Surfaces: From Natural to Artificial", Adv. Mater., 14(24), (2002), 1857-1860.

Fortini, A., et al., "Dynamic Stratification in Drying Films of Colloidal Mixtures", Physical Review Letters, 116, 118301, (2016), 5 pgs.

Glaser, N., et al., "Janus Particles at Liquid-Liquid Interfaces", Langmuir, 22, (2006), 5227-5229.

Golling, Florian, et al., "Polyurethanes for coatings and adhesives—chemistry and applications", Polymer International, 68(5), (2019), 848-855.

Jiang, Shan, et al., "Design colloidal particle morphology and self-assembly for coating applications", Chemical Society Reviews, 46(12), (2017), 3792-3807.

Joo, Minjung, et al., "Corrosion resistance of self-stratifying coatings using fluorovinyl ether/BPA epoxide", Progress in Organic Coatings, vol. 133, (Aug. 2019), 145-153.

Kim, H., et al., "Magnetic-Patchy Janus Colloid Surfactants for Reversible Recovery of Pickering Emulsions", ACS Appl. Mater. Interfaces., 10(1), (2018), 1408-1414.

Kim, J. W., et al., "Synthesis of Monodisperse Bi-Compartmentalized Amphilic Janus Microparticles for Tailored Assembly at the Oil-Water Interface", Angew. Chem. Int. Ed. Engl., 55(14), (2016), 4509-4513.

Kumar, A., et al., "Amphiphilic Janus particles at fluid interfaces", Soft Matter, 9(29), (2013), 6604-6617.

Li, Yifan, et al., "Morphology evolution of Janus dumbbell nanoparticles in seeded emulsion polymerization", J. Colloid Interface Sci., vol. 543, (2019), 34-42.

Liang, F., et al., "Janus Colloids toward Interfacial Engineering", Langmuir, 34(14), (2018), 4123-4131.

Liu, F., et al., "Self-assembly of Janus Dumbbell Nanocrystals and Their Enhanced Surface Plasmon Resonance", Nano Letters, 19(3), (2019), 1587-1594.

Liu, M., et al., "Bioinspired Design of a Superoleophobic and Low Adhesive Water/Solid Interface", Advanced Materials 21(6), (2009), 665-669.

Liu, X., et al., "Stratification during evaporative assembly of multicomponent nanoparticle films", J. Colloid Interface Sci., 515, (2018), 70-77.

Makepeace, D. K., et al., "Stratification in binary colloidal polymer films: experiment and simulations", Soft Matter, 13, (2017), 6969-6980.

Martín-Fabiani, I., et al., "pH-Switchable Stratification of Colloidal Coatings: Surfaces "On Demand"", ACS Appl. Mater. Interfaces, 8, (2016), 34755-34761.

Miller, K., et al., "Drying mediated orientation and assembly structure of amphiphilic Janus particles", Soft Matter, 14(33), (2018), 6793-6798.

Nikiforow, Irina, et al., "Self-stratification during film formation from latex blends driven by differences in collective diffusivity", Langmuir, 26(16), (2010), 13162-13167.

Olson, E., et al., "Thin Biobased Transparent UV-Blocking Coating Enabled by Nanoparticle Self-Assembly", ACS Appl. Mater. Interfaces, 11(27), (2019), 24552-24559.

Park, B. J., et al., "Janus particles at an oil-water interface", Soft Matter, 7(14), (2011), 6413-6417.

Qin, S., et al., "Interfacial adsorption of pH-responsive polymers and nanoparticles", Soft Matter, 13(30), (2017), 5137-5149.

Rezaee, N., et al., "Studying corrosion performance, microstructure and adhesion properties of a room temperature zinc phosphate conversion coating containing Mn2+ on mild steel", Surf. Coat. Technol., 236, (2013), 361-367.

Schulz, M., et al., "A critical and quantitative review of the stratification of particles during the drying of colloidal films", Soft Matter, 14(30), (2018), 6181-6197.

Synytska, A., et al., "Water-Repellent Textile via Decorating Fibers with Amphiphilic Janus Particles", ACS Appl. Mater. Interfaces, 3(4), (2011), 1216-1220.

Tang, Yanfei, et al., "Stratification in Drying Films Containing Bidisperse Mixtures of Nanoparticles", Langmuir, 34(24), (2018), 7161-7170.

Tejasvi, Ravi, et al., "Passive photo-catalytic destruction of airborne VOCs in high traffic areas using TiO2-coated flexible PVC sheet", Chemical Engineering Journal, vol. 262, (2015), 875-881.

Trueman, R. E., et al., "Autostratification in Drying Colloidal Dispersions: Experimental Investigations", Langmuir, 28(7), (2012), 3420-3428.

Tsyrenova, A., et al., "Surfactant-Mediated Assembly of Amphiphilic Janus Spheres", Langmuir, 35(18), (2019), 6106-6111.

Wallbridge, D. J., et al., "Self-stratifying coatings—an overview of a European Community Research Project", Progress on Organic Coatings 28(3),, (Jul. 1996), 155-159.

Wang, H., et al., "Image Charge Effects on the Formation of Pickering Emulsions", J. Phys. Chem., 3(20), (2012), 2986-2990.

Wang, X., et al., "Amphiphilic Janus Particles Generated via a Combination of Diffusion-Induced Phase Separation and Magnetically Driven Dewetting and Their Synergistic Self-Assembly", Adv. Mater., 28, (2016), 3131-3137.

Wu, Guo-Min, et al., "Crosslinking reaction and properties of two-component waterborne polyurethane from terpene-maleic ester type epoxy resin", Journal of Applied Polymer Science, 128(1), (2013), 132-138.

Xiao, M., et al., "Experimental and theoretical evidence for molecular forces driving surface segregation in photonic colloidal assemblies", Science Advances, 5, eaax1254, (2019), 11 pgs.

Xie, Qingyi, et al., "Self-Stratifying Silicone Coating with Nonleaching Antifoulant for Marine Anti-Biofouling", Advanced Materials Interfaces, 1900535, (May 2019), 9 pgs.

Yang, H., et al., "Lotus leaf inspired robust superhydrophobic coating from strawberry-like Janus particles", NPG Asia Mater., 7, (2015), e176-e176.

Zahedi, S., et al., "Self-stratifying coatings: a review", Journal of Coatings Technology and Research, 15(1), (2018), 1-12.

Zeng, Weixiu, et al., "One-coat epoxy coating development for the improvement of UV stability by DPP", Dyes and Pigments, vol. 151, (2018), 157-164.

Zhang, J., "Janus Particle Synthesis, Assembly, and Application", Langmuir, 33, (2017), 6964-6977.

Zhou, J., et al., "Cross Interaction Drives Stratification in Drying Film of Binary Colloidal Mixtures", Phys. Rev. Lett., 2017, 118(10), 108002., (2017), 5 pgs.

Zubielewicz, Malgorzata, et al., "The influence of ageing of epoxy coatings on adhesion of polyurethane topcoats and protective properties of coating systems", Progress in Organic Coatings, 66(2), (Oct. 2009), 129-136.

\* cited by examiner

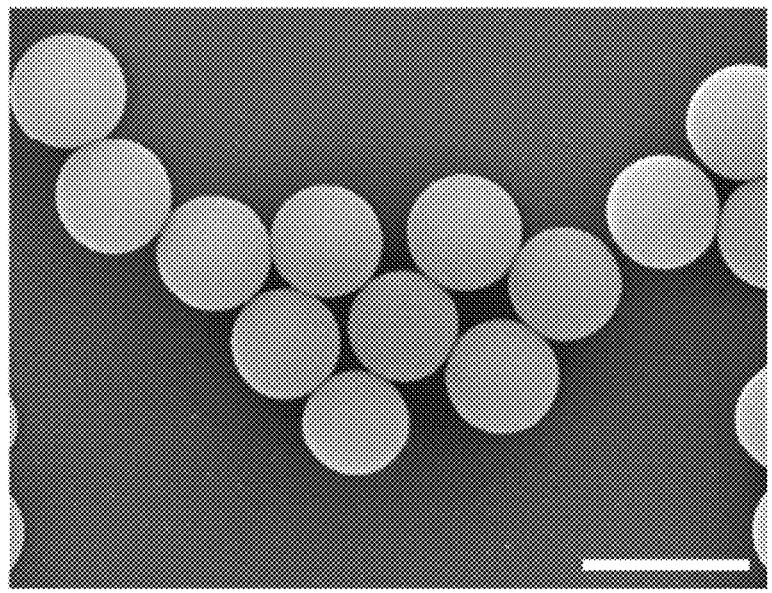
FIG. 6
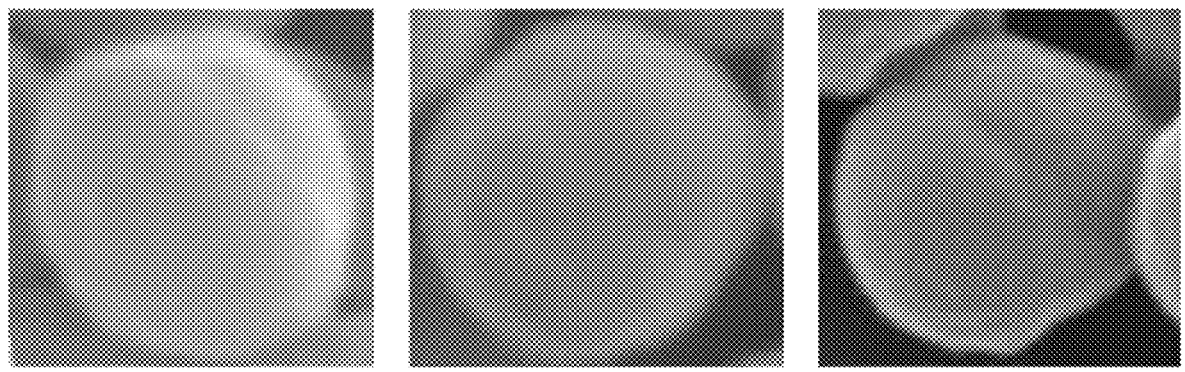
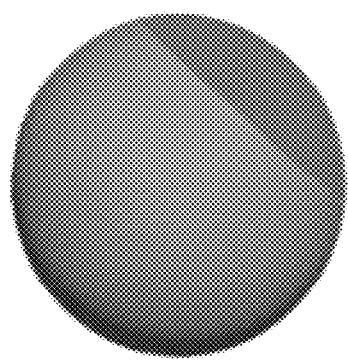 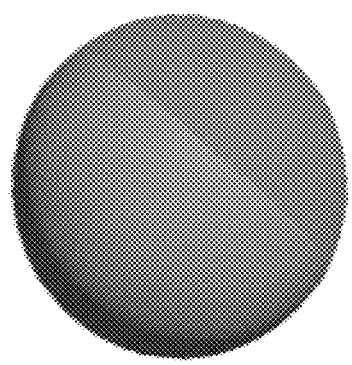 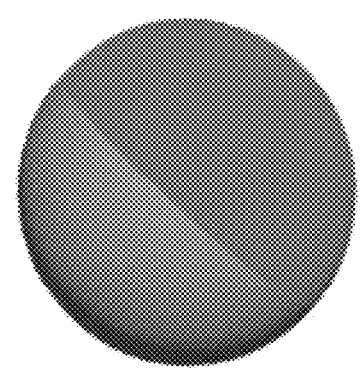
FIG. 7A      FIG. 7B      FIG. 7C

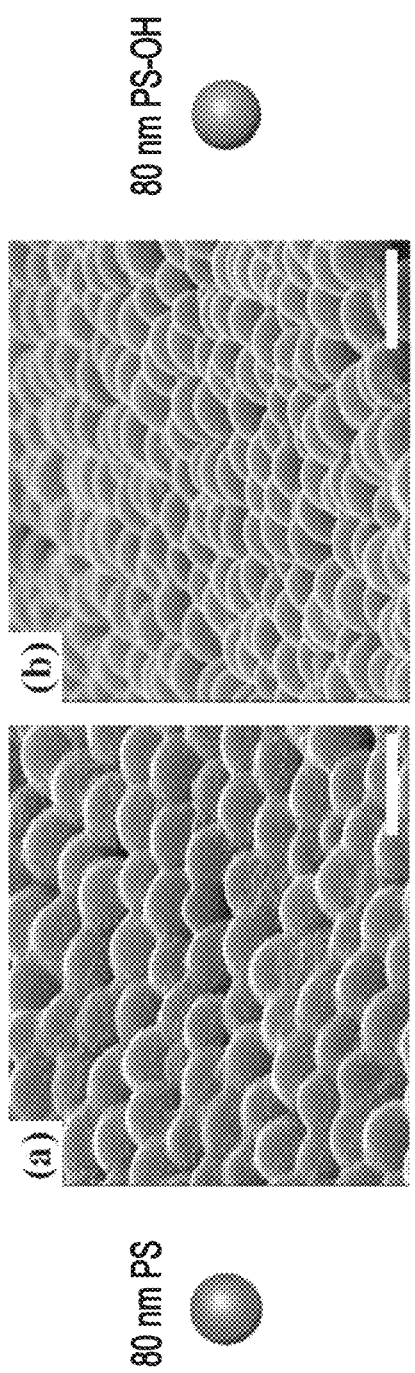
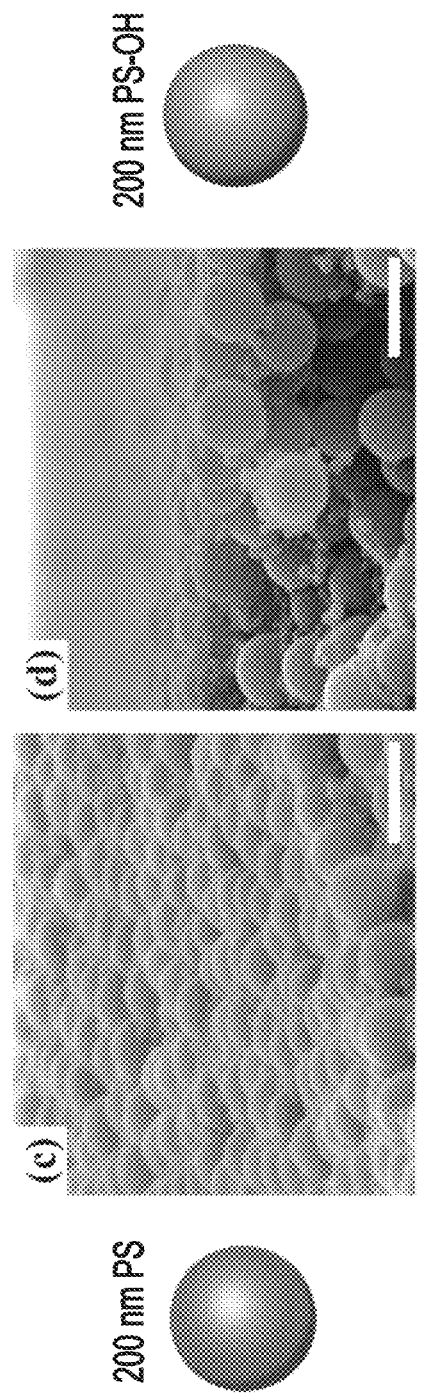
FIG. 12A  FIG. 12B  FIG. 12C  FIG. 12D

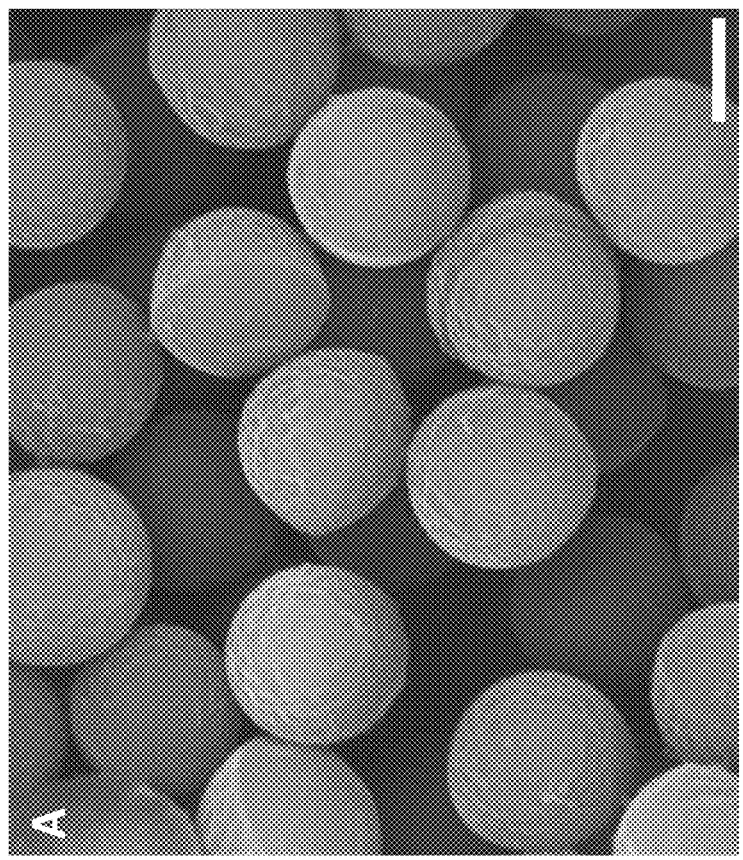
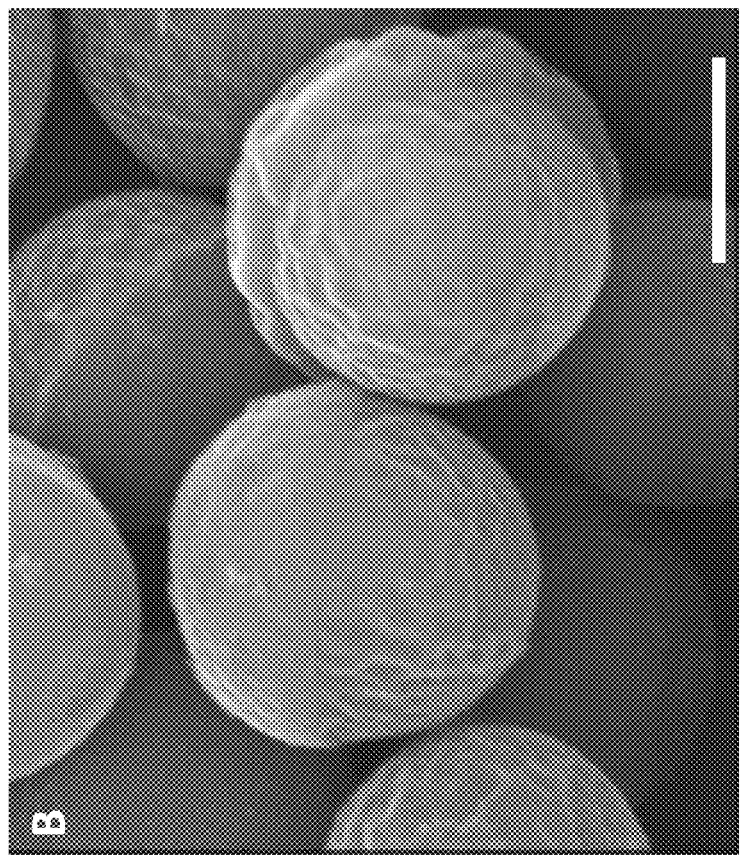
FIG. 14A-B

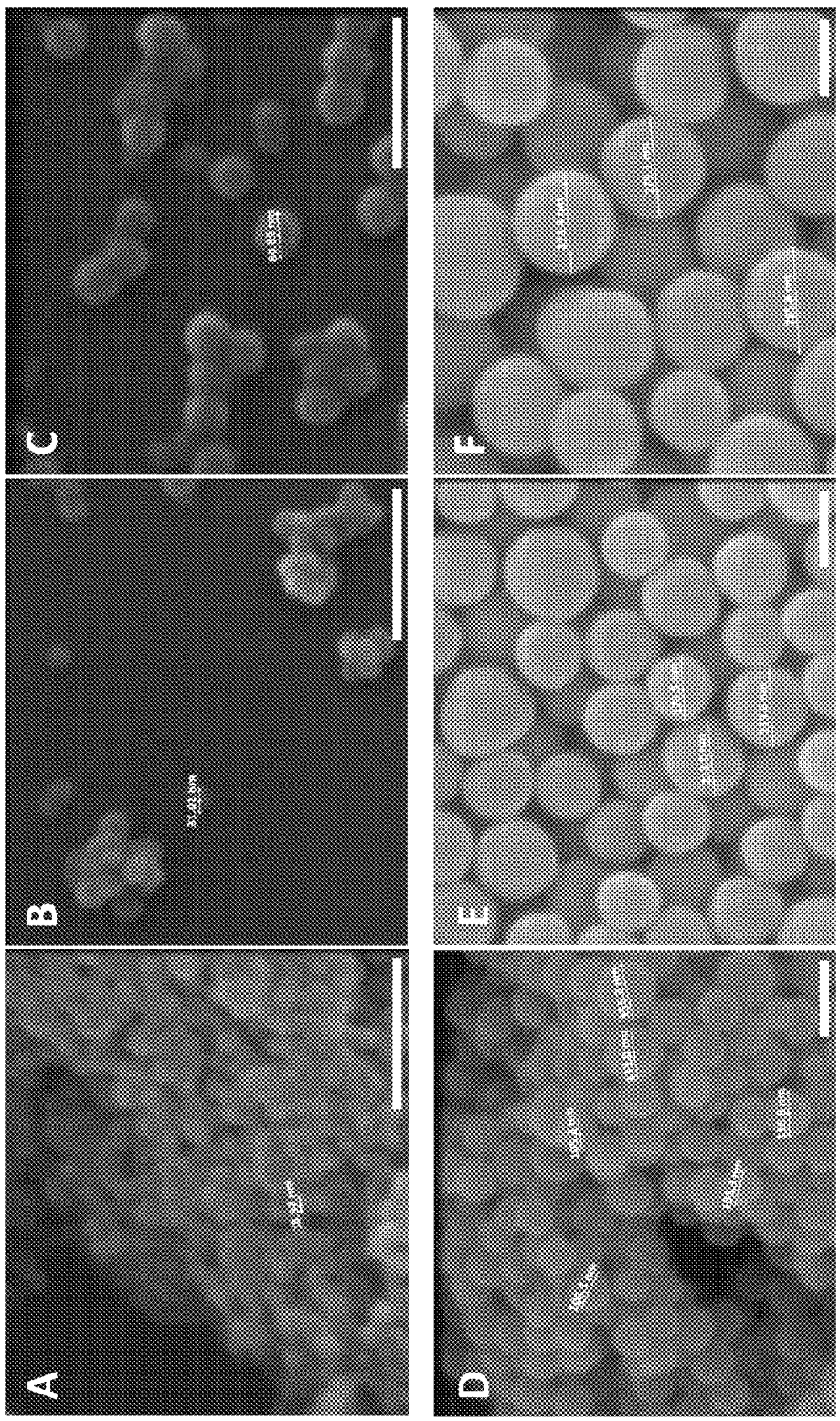
FIG. 15A-F

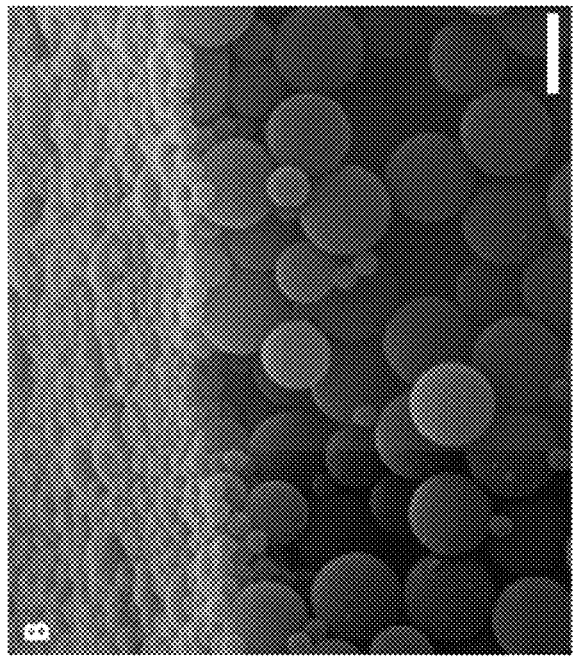
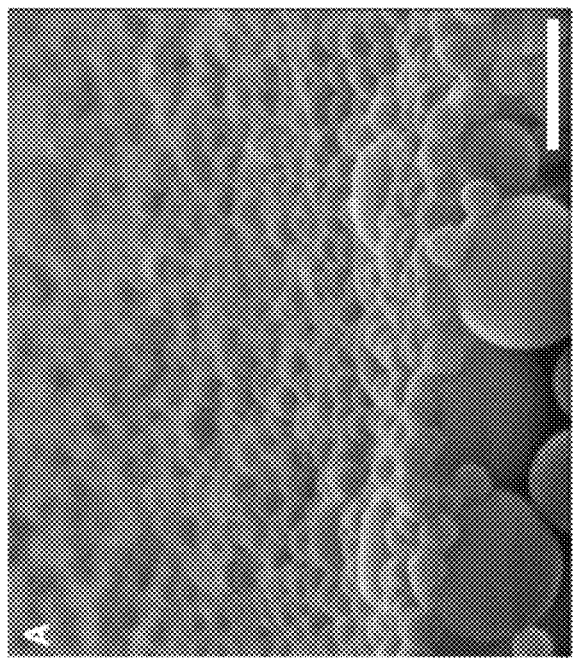
FIG. 16 A-B

COMPOSITION COMPRISING SELF-STRATIFYING AMPHIPHILIC JANUS PARTICLES

CROSS REFERENCE TO RELATED APPLICATIONS

This application is a continuation of U.S. patent application Ser. No. 17/320,716, filed May 14, 2021, which claims priority to U.S. provisional patent application No. 63/027,193, which was filed on May 19, 2020, and which is hereby incorporated by reference in its entirety.

BACKGROUND

The revolutionary replacement of organic solvent-based coatings by waterborne emulsion latex polymer coatings has substantially reduced the prevalence of volatile organic compounds (VOCs), from 700 g/L in 1940s to ~50 g/L in 2010s. The technology has generated profound impact in industry and everyday life, producing great environmental and health benefits. However, these waterborne coatings have created unique challenges in maintaining high coating performance, such as suspension stability, water resistance, film formation, and surface hardness. Many of the coating properties can hardly be achieved simultaneously with a simple system. For example, coating stability of waterborne latex paint requires emulsion particles to be hydrophilic and completely dispersible in water. However, upon drying, a water-resistant and hydrophobic coating film is preferable. A durable coating film demands excellent adhesion on the substrate surface, while showing good hardness (low tackiness) at the coating-air interface. This means it is beneficial to possess different or even opposite properties on the two sides of the coating films.

One approach to combine these different properties is to apply multiple coats. It is common practice to coat primers as the first layer to provide good adhesion. After the primer is dried, a topcoat is then applied to afford more desirable surface properties. However, this approach consumes extra materials, time and effort. For applications that require both performance and fast turn-around, such as traffic coating, a simple one coat solution is strongly preferred. Another grand challenge in waterborne coating materials is to eliminate VOCs and create the "zero-VOC" paint. Such coatings will further benefit environmental and consumer health. However, removing all the VOCs will make it difficult for latex particles to form an integral coating film unless the glass transition temperature ($T_g$) for polymer binder is greatly reduced. This can be done by altering the polymer chemistry or adding non-evaporative coalescent molecules, however doing so will inevitably hurt coating hardness and many other properties. Therefore, technology that can guarantee film formation while providing a hard coating surface becomes a holy grail in coating research. Most of the ideas have been developed around two-component "2K" systems and crosslinking chemistry, which usually are much more costly and require complicated chemistry and formulation.

Janus particles have been tested as coating materials in previous studies. However, most studies involve complex synthetic routes such as surface ATRP (atom transfer radical polymerization) to fabricate the Janus particles, which significantly hinders their large-scale industrial applications. In addition, the substrate is usually pre-treated with special chemistries or coating layers, such as epoxy groups, to enable the adhesion and precise control of the assembly and orientation of Janus particles. The final coating film structures and properties are also very sensitive to the experimental conditions. The requirement of special substrate and stringent processing conditions almost completely negate the possibility of broad and practical implementation in coating applications. Furthermore, to coat large surface areas, an immense number of Janus particles are needed, which becomes very costly.

Hence there exist a need for scalable and economical synthetic route to produce a large quantity of amphiphilic Janus particles based on emulsion polymerization techniques broadly adopted in the coating industry.

SUMMARY OF THE INVENTION

The disclosure relates to a composition comprising amphiphilic Janus particles; and a waterborne binder; wherein the particles are self-stratified.

The disclosure also relates to a method of making the composition of the disclosure, comprising adding Janus particles to a waterborne binder.

The disclosure also relates to a method of making amphiphilic Janus particle comprising: i) making a hydrophilic seed, and ii) adding a monomer to the seed to form a hydrophobic lobe.

The disclosure also relates to a method of making amphiphilic Janus particle comprising: i) making a hydrophobic seed, and ii) adding a monomer to the seed to form a hydrophilic lobe.

In various aspects, the disclosure relates to a method of coating a surface, comprising treating the surface with a composition of the disclosure.

In various aspects, the disclosure relates to a of improving water resistance of a surface, comprising treating the surface with a composition of the disclosure.

In various aspects, the disclosure relates to a method of improving adhesion of a surface, comprising treating the surface with a composition of the disclosure.

In various aspects, the disclosure relates to a method of improving surface hardness of a surface, comprising treating the surface with a composition of the disclosure.

In various aspects, the disclosure relates to a method of improving film formation on a surface, comprising treating the surface with a composition of the disclosure.

In various aspects, the disclosure relates to a method of improving skin, comprising treating the skin with a composition of the disclosure.

BRIEF DESCRIPTION OF THE FIGURES

The drawings illustrate generally, by way of example, but not by way of limitation, various embodiments of the present invention.

FIG. 3A shows films formed with Janus particles self-stratified to the surface; FIG. 3B shows films with hydrophobic homogeneous particles, which showed no stratification. Scale bars are all 2 μm. Insets are confocal fluorescent image of the corresponding coating film and contact angles of the corresponding coating surface after solvent rinse. Janus and hydrophobic particles were labelled with Nile red and binder particles were labelled with green FITC; FIG. 3C is a photo of the coating film added with Janus particles after solvent rinse; FIG. 3D is a photo of the coating film added with homogeneous particles after solvent rinse.

FIG. 4A is a commercial primer added with 400 nm Janus particles; FIG. 4B is a commercial primer added with both 400 nm and 1.0 μm Janus particles; Scale bars are all 2 μm; FIG. 4C shows the representative force-distance curves recorded during retraction of AFM tip from the coating film surfaces.

FIG. 6 shows SEM images of phosphate binder microparticles. Scale bar: 2 μm.

FIGS. 7A-C are the morphologies of the amphiphilic Janus particles with different hydrophilic/hydrophobic volume ratio, FIG. 7A: 80-20, FIG. 7B: 60-40, FIG. 7C: 50-50.

FIGS. 12A-D show SEM image of the cross-section view of coating structures. Scale bar is 2 μm. FIG. 12A shows 80 nm homogeneous polystyrene particles, surface not treated; FIG. 12B shows 80 nm homogeneous polystyrene particles, surface functionalized with hydroxy groups; FIG. 12C shows 200 nm homogeneous polystyrene particles, surface not treated; FIG. 12D shows 200 nm homogeneous polystyrene particles, surface functionalized with hydroxy groups; Scale bar: 2 μm.

FIG. 13B under open-lid evaporation.

FIGS. 14A-B show SEM images of fluorinated amphiphilic Janus particles. Scale bars are all 1 μm.

FIGS. 15A-F show SEM images of smaller PS-co-PVA hydrophilic seed nanoparticles with tunable diameters. Scale bars are all 200 nm.

FIGS. 16A-B shows SEM images of the cross-section view of dried coating structures, formed by active self-stratification of 300 nm amphiphilic Janus particles mixed with binder particles. Scale bars are all 1 μm.

DETAILED DESCRIPTION OF THE INVENTION

Figure 1A:
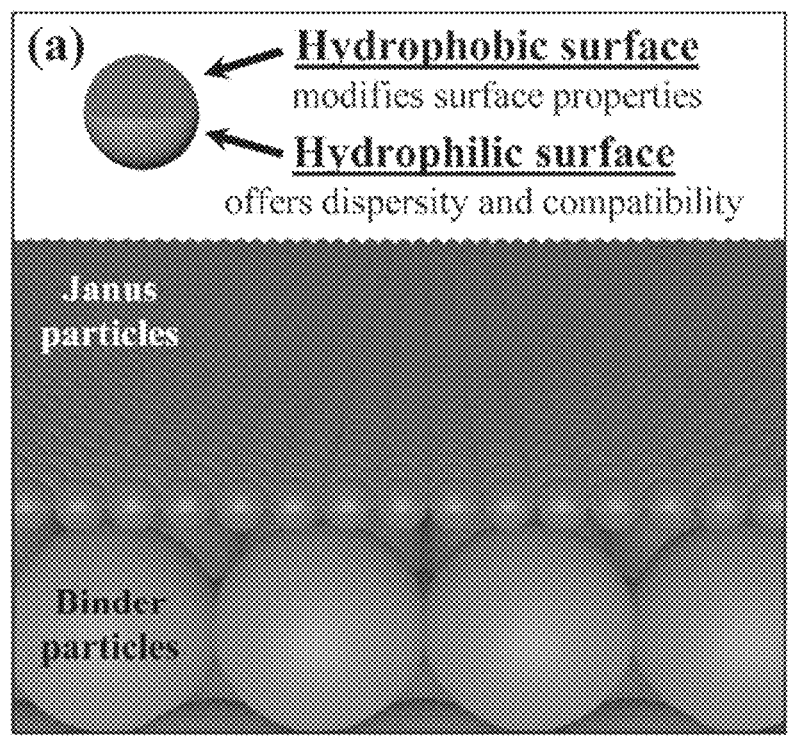
FIG. 1A is a schematic diagram for the coating structures formed by active self-stratification of amphiphilic Janus particles mixed with binder particles.

The disclosure relates in part to the development one-pot, self-stratifying coating systems, where the surface of the coating film differs from the bulk. In this way, many coating properties dictated by the surface layer, such as tackiness, hardness, water resistance, and dirt pick-up, can be designed and optimized separately from the bulk materials. Conventional coating systems do not self-stratify. Previous studies demonstrated that self-stratification will only happen for polymers of specific chemistry or particle mixtures of certain size ratios when a coating suspension dries. These constraints severely limit the application of self-stratification in common coating materials. In order to achieve effective stratification, current coating formulation and binder chemistry need to be comprehensively altered, which demands significant efforts.

Different from conventional homogeneous particles, Janus particles adsorb strongly at the interface. Conventional self-stratification for homogeneous particle mixtures is driven passively by the drying of the solvent. The difference in diffusion rate for particles of different sizes will lead to a different amount of accumulation at the drying front. The Peclet number, the ratio of the evaporation rate against the diffusion rate, is often used to quantify and predict the stratification behavior. However, the Peclet number does not consider the surface adsorption of particles at all. For this reason, the physics of active self-stratification of amphiphilic Janus particles is completely different due to their strong adsorption at the interface. The disclosure provides experimental evidence of Janus particles actively driving the self-stratification at the coating surfaces.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "diameter" as used herein refers to the largest dimension of the particle if it is not round.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than 5 wt % and less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, the term "polymer" refers to a molecule having at least one repeating unit and can include copolymers.

As used herein "waterborne" binder refers to resins or polymeric resins that use water as the carrying medium or part of the carrying medium as opposed to solvent or solvent-less. Binders are used for example in the production of coatings, adhesives, sealants, elastomers and composite materials. "Waterborne binder" refers to any binder which have water as part of the carrying solvent. The binder could be water soluble, water reducible or water dispersed.

Amphiphilic Janus Particles

In some embodiments, the Janus particles comprise a polymeric hydrophobic lobe; and a polymeric hydrophilic lobe. The hydrophilic lobe can include charged functional groups, such as phosphate, carboxylic and amine groups, or polar groups such as hydroxy groups. The hydrophilic polymers or co-polymers can be made, for example, from methacrylic phosphate, acrylic acid, methacrylic acid, 4-hydroxybutyl acrylate, (meth)acrylate, or vinyl acetate. The hydrophilic polymer can also be achieved through hydrolysis of polyesters.

The hydrophilic lobe can comprise polyethylene glycol, polysaccharides, or polyacrylamide, or a combination thereof. The hydrophilic lobe comprises polyethylene oxide, polymalic acid, polyaspartic acid, polyglutamic acid, polylysine, or polysaccharide, or a combination thereof.

The hydrophobic lobe can include hydrocarbon chains, fluorinated acrylate, benzene rings or siloxane groups, or a combination thereof. The hydrophobic polymers or co-polymers can be made, for example, from styrene, butyl acrylate, stearyl acrylate, trifluoroethyl methacrylate, or tetradecyl acrylate. The hydrophobic lobe can comprise polyaspartic acid, polyglutamic acid, or polylysine, or a combination thereof. The hydrophobic lobe can comprise poly(β-benzyl L-aspartate), poly(γ-benzyl L-glutamate), poly(β-substituted aspartate), poly(γ-substituted glutamate), poly(L-leucine), poly(L-valine), poly(L-phenylalanine), or hydrophobic polyamino acids, or a combination thereof. The hydrophobic lobe can also comprise polystyrene, polytetradecyl acrylate, polymethacrylate, polyacrylate, polymethacrylate amide, polyacrylate amide, polyamide, polyester, polyalkylene oxide, or hydrophobic polyolefins, or a combination thereof.

The Janus particles of the disclosure can include a hydrolyzed PS-co-PVA hydrophilic lobe and a PTA hydrophobic lobe, and a hydrolyzed PS-co-PVA hydrophilic lobe and a PTFEMA hydrophobic lobe.

Synthesis of Amphiphilic Janus Particles

The disclosure relates to methods of synthesizing the amphiphilic Janus particles. The method can include: i) making a hydrophobic seed with controllable diameters, and ii) adding a monomer to the seed to form a hydrophilic lobe.

The disclosure relates to methods of synthesizing the amphiphilic Janus particles. The method can include: i) making a hydrophilic seed with controllable diameters, and ii) adding a monomer to the seed to form a hydrophobic lobe.

The hydrophobic seed can be made from an acrylic monomer. In some embodiments, the hydrophobic seed is made from styrene and vinyl acetate. The hydrophobic seed can be hydrolyzed, such as saponified.

The monomer of step ii) can be added to a solution comprising the seed of step i). Steps i and ii) can be a two steps—two pots sequence, or a two steps—one pot reaction.

The seed can be made via dispersion polymerization, suspension polymerization or emulsion polymerization, while step ii) is an emulsion polymerization.

The polymerization can be, for example, UV thermal or redox initiated polymerization.

The solvent of steps i) and ii) can be an alcohol/water mixture. The alcohol can be ethanol or methanol. The alcohol/water mixture can be in a ratio of about 1:1 to 8:1, or 1:1 to 10:1, for example about 1:1, 2:1, 3:1, 4:1, 5:1, 6:1, 7:1, 8:1, 9:1, or 10:1.

The seeds can have diameters between 20 nm-300 nm. The seeds can have diameters between 20 nm-50 nm. The seeds can have diameters between 20 nm-100 nm. The seeds can have diameters between 20 nm-500 nm.

The disclosure relates to the synthesis of amphiphilic Janus particles having diameters smaller than 3 μm. The Janus particles of the disclosure have diameters between 200 nm and 3 μm. In some embodiments, the Janus particles of the disclosure have diameters between 200 nm and 1 μm. In some embodiments, the Janus particles of the disclosure have diameters between 200 nm and 400 nm. In some embodiments, the Janus particles of the disclosure have diameters between 100 nm and 400 nm. In some embodiments, the Janus particles of the disclosure have diameters between 100 nm and 500 nm. In some embodiments, the Janus particles of the disclosure have diameters between 40 nm and 500 nm. In some embodiments, the Janus particles of the disclosure have diameters between 40 nm and 100 nm. In some embodiments, the Janus particles of the disclosure have diameters between 50 nm and 100 nm. In some embodiments, the Janus particles of the disclosure have diameters between 40 nm and 50 nm.

Compositions of the Disclosure

Various embodiments of the present invention provide a composition comprising Janus particles; and a waterborne binder; wherein the particles are self-stratified.

In some embodiments, any suitable proportion of the composition can be Janus particles, such as about 50 wt %, or such as about 1 wt % to about 25 wt %, or about 5 wt % or less, or less than, equal to, or greater than about 1 wt %, 2, wt %, 3 wt %, 4 wt %, 5 wt %, 6 wt %, 7 wt %, 8 wt %, 9 wt %, 10 wt %, 15 wt %, 20 wt %, 25 wt % or more. In some embodiments, the Janus particles are no more than 25 wt % of the composition, such as less than 15 wt % of the composition, less than 5 wt %, or between 1 and 5 wt % of the composition.

The composition of the disclosure can further comprise a co-solvent. The co-solvent can be organic, inorganic, or combination of both.

An inorganic solvent can be, for example, ammonia, liquid sulfur dioxide, sulfuryl chloride, sulfuryl chloride fluoride, phosphoryl chloride, dinitrogen tetroxide, antimony trichloride, bromine pentafluoride, hydrogen fluoride, pure sulfuric acid and other inorganic acids. The solvent can be water. An organic solvent can be, for example a hydrocarbon-based solvent, a ketone-based solvent, an ester-based solvent, an alcohol-based solvent, an amide-based solvent and an ether-based solvent. The organic solvent can be a nonpolar solvent, a polar aprotic solvent, a polar protic solvent. Common organic solvents can be, for example, as listed at: https://www.organicdivision.org/wp-content/uploads/2016/12/organic_solvents.html. A solvent or co-solvent can be a mixture of organic solvents, or a mixture of inorganic solvents, or a combination thereof. A solvent or co-solvent can be a mixture of at least one organic solvent and water.

The waterborne binder of the composition can be synthetic. The waterborne binder of the composition can be a natural resin. The waterborne binder of the composition can be a polymer resin such as epoxies, acrylics, vinyls, polyesters, alkyds, styrene-butadiene, and urethanes.

The waterborne binder of the composition can be a homo- or copolymer comprising monomer units of acrylate, methacrylate, vinyl acetate and/or units of urethane or urethane/urea. Typical binder polymers are styrene acrylate copolymers, acrylate methacrylate copolymers, acrylate or methacrylate copolymers with vinyl acetate, vinyl acetate homopolymers, vinyl versatate homopolymers and copolymers of ethylene and vinyl acetate or vinyl versatate.

The waterborne binder of the composition can be a primer product. The waterborne binder of the composition can be found in aqueous paint formulations, adhesives and sealants. The waterborne binder of the composition can be found in printing inks. The waterborne binder of the composition can be found in cosmetic products, such as, for example, creams, lotions, make-up, gels, and serums. The waterborne binder of the composition can be a latex coating.

Self-stratification of the Janus particles includes the Janus particles orienting their hydrophobic side towards air. The Janus particles have Janus balance of about 40% or greater, such as 50%. In other words, the Janus particles can have about 40% or greater, such as 50% of surface area being hydrophobic.

Self-stratification of the Janus particles can be determined, for example, by measuring the water contact angle of the coating surfaces.

Method of Making the Composition

Various embodiments of the present invention provide a method of making a composition including Janus particles and a waterborne binder wherein the particles are self-stratified, the method comprising: adding Janus particles to a waterborne binder.

The Janus particles can be added neat to the binder. The Janus particles can be pre-mixed with a co-solvent, and added to the binder as a solution, suspension or emulsion. The Janus particles can be added at below, above or at room temperature. The addition of the Janus particles to a waterborne binder can be done in any order of addition to make a composition comprising Janus particles and a waterborne binder.

The Janus particles can be added to the binder in about 50 wt %, or such as about 1 wt % to about 25 wt %, or about 5 wt % or less, or less than, equal to, or greater than about 1 wt %, 2, wt %, 3 wt %, 4 wt %, 5 wt %, 6 wt %, 7 wt %, 8 wt %, 9 wt %, 10 wt %, 15 wt %, 20 wt %, 25 wt % or more. The wt % is the amount of neat Janus particle relative to the neat waterborne binder. In some embodiments, Janus particles can be added to the binder in about 15 wt %. In some embodiments, Janus particles can be added to the binder in about 10 wt %. In some embodiments, Janus particles can be added to the binder in about 5 wt %. In some embodiments, Janus particles can be added to the binder in about 1 wt % to 5 wt %. In some embodiments, Janus particles can be added to the binder in about 5 wt % to 10 wt %.

The composition comprising Janus particles and a waterborne binder can be mixed, stirred, sonicated, vortexed, or shaken. The composition comprising Janus particles and a waterborne binder can be mixed via technologies based on acoustics.

Methods of Using the Janus Particles

The disclosure relates to a method of coating a surface, comprising treating the surface with a composition of the disclosure. Treating can be spraying, painting, brushing, rolling, scrubbing, or electrostatic painting. Treating can also be dipping or immersing. Treating can also be drop coating.

In various aspects, the method of coating a surface with a composition of the disclosure further comprising drying the surface. Drying can be direct or indirect. Drying can be air heated or spray drying. Drying can be drum drying, vacuum drying. Drying can be dielectric drying, freeze drying of supercritical drying. Drying can be natural air drying.

The disclosure relates to a method of improving water resistance of a surface, comprising treating the surface with a composition of the disclosure.

The disclosure relates to a method of improving adhesion of a surface, comprising treating the surface with a composition of the disclosure.

The disclosure relates to a method of improving surface hardness of a surface, comprising treating the surface with a composition of the disclosure.

The disclosure relates to a method of improving film formation on a surface, comprising treating the surface with a composition of the disclosure. The coating films formed formed by active self-stratification of the Janus particles can have a flatter surface compared with the films with only homogenous particles.

The disclosure relates to a method of improving skin, comprising treating the skin with a composition of the disclosure.

The disclosure relates to any type of surfaces. A surface can be, for example, a wood surface, a glass surface, a metal surface, a cement surface, a concrete surface, a paper surface, a gypsum board, drywall, or a plastic surface. The surface can be skin. The surface can be eyelashes or eyebrows. The surface can be hair. The surface can be a nail.

EXAMPLES

Various embodiments of the present invention can be better understood by reference to the following Examples which are offered by way of illustration. The present invention is not limited to the Examples given herein.

Chemicals and reagent. Styrene (St, 99%), ethanol (EtOH, 200 Proof, 100%), polyvinylpyrrolidone (PVP, $M_n$=40 000 g mol$^{-1}$), poly(vinyl alcohol) (PVA, Mw=13 000-23 000 g mol$^{-1}$, 87-89% hydrolyzed), polyoxyethylene (12) octylphenyl ether (OP-10), sodium dodecyl sulfate (SDS), ethylene glycol dimethacrylate (EGDMA, 98%), 2,2,2-trifluoroethyl methacrylate (TFEMA), 1-hydroxycyclohexyl phenylketone (Irgacure 184, 99%), Pluronic F-127 (Poloxamer 407), 2,2'-Azobis(isobutyronitrile) (AIBN, 98%), phosphoric acid 2-hydroxyethyl methacrylate ester and vinyl acetate (VAc, 99%) were purchased from Sigma-Aldrich (USA). Tetradecyl acrylate (TA) was purchased from TCI chemicals (Japan). Peel Stop® Clear Binding Primer was purchased from Zinsser. Hardened Corrosion-Resistant 316 Stainless Steel was purchased from McMaster-Carr. Deionized triple distilled water was used in all experiments. All chemicals were of reagent grade and used without further purification.

Synthesis of PS-co-PVA hydrophilic nanoparticles: Styrene (4 ml), VAc (1 ml), PVP (2.0 g, a stabilizer), and AIBN (0.05 g, an initiator) were dissolved in a mixture of EtOH (25 ml, 200 proofs) and deionized water (25 ml) in a 100 mL round-bottom flask. The reaction mixture was purged with argon for 15 mins to remove oxygen. Then, the polymerization was carried out at 70° C. in an oil bath while stirring at 200 rpm for 36 h. After the polymerization, the particles were washed repeatedly via centrifugation with EtOH/water mixture (1/1 by volume). Then, the obtained PS-co-PVAc seed particles were converted into polystyrene-co-polyvinyl alcohol (PS-co-PVA) using saponification, which was carried out under basic conditions (NaOH solution at pH=10) for 8 h at room temperature. Last, the PS-co-PVAc particles were stored in the EtOH/water mixture (2/1 by volume) with a combination of surfactant PVA (2 wt %) and Pluronic F-127 (2 wt %). The hydrophilic particle concentration was tuned to 0.02 g/ml. A series of smaller hydrophilic PS-co-PVAc seed particles with 20 nm-300 nm diameters can be made by incorporate the sodium dodecyl sulfate and divinylbenzene into the synthesis recipe.

Synthesis of amphiphilic Janus particles: 2.5 ml PS-co-PVA seed particles emulsion (0.02 g/ml) were swollen with a mixture of TA (1.2 ml, a hydrophobic monomer), EGDMA (0.3 ml, a crosslinker), and Irgacure 184 (0.06 g) in the presence of PVA (2 wt %) and Pluronic F-127 (2 wt %) in an EtOH/water (2/1 by volume) solution (1.5 ml) for 8 h at room temperature. In this step, the hydrophobic monomer feeding ratio against the PS-co-PVA seed particles (0.05 g) was carefully adjusted to achieve the 50-50 hydrophilic-hydrophobic volume ratio. After that, the monomers in the swollen particles were photopolymerized by UV irradiation for 5 min while tumbling at 50 rpm under room temperature. The process induced a phase separation between the PS-co-PVA seed phase and the secondary polymerized poly(tetradecyl acrylate) (PTA) phase. Amphiphilic PS-co-PVA/PTA Janus particles were then washed repeatedly with a mixture of EtOH/water (1/1 by volume) to remove the remaining monomers and organic additives. 2.5 ml PS-co-PVA seed particles emulsion (0.02 g/ml) were swollen with a mixture of 2,2,2-Trifluoroethyl methacrylate (0.5 ml, a hydrophobic monomer), EGDMA (0.5 ml, a crosslinker), and Irgacure 184 (0.06 g) in the presence of SDS (1-10 wt %), OP-10 (1-10 wt %), PVA (1-10 wt %) and Pluronic F-127 (1-10 wt %) in a water solution (1.5 ml) for 8 h at room temperature. In this step, the hydrophobic monomer feeding ratio against the PS-co-PVA seed particles (0.05 g) was carefully adjusted to achieve the 50-50 hydrophilic-hydrophobic volume ratio. After that, the monomers in the swollen particles were photopolymerized by UV irradiation for 5 min while tumbling at 50 rpm under room temperature. The process induced a phase separation between the PS-co-PVA seed phase and the secondary polymerized poly(trifluoroethyl methacrylate) (PTFEMA) phase. Amphiphilic PS-co-PVA/PTFEMA Janus particles were then washed repeatedly with a mixture of EtOH/water (1/1 by volume) to remove the remaining monomers and organic additives.

Synthesis of hydrophilic binder microparticles: Phosphate microparticles were prepared by dispersion polymerization. Typically, in a 100 ml round-bottom flask, 1 g PVP was dissolved in ethanol with a total weight of 40 g under the mechanical stirring, 4 ml styrene, 0.05 g phosphoric acid 2-hydroxyethyl methacrylate ester and 0.05 g AIBN was then added into the flask, the pH was tuned to 7 with base buffer. The solution was deoxygenated by bubbling argon for 15 min. The flask was then placed in an oil bath at 65±1° C. and 60 rpm of mechanical stirring rate was applied. After polymerization for 24 h, the milky dispersion of phosphate microparticles was cooled under room temperature then washed and separated by centrifugation at 5000 rpm in the EtOH/water (1/1, by volume) mixture for three times. The procedure to synthesis acetic acid binder particles remains the same, with 0.05 g acetic acid in replace of phosphoric acid 2-hydroxyethyl methacrylate ester.

Synthesis of PS-co-PVAc intermediate hydrophobic nanoparticles (for control purpose):[1] Styrene (4 ml), VAc (1 ml), PVP (1.6 g, a stabilizer), and AIBN (0.05 g, an initiator) were dissolved in a mixture of EtOH (25 ml, 200 proofs) and deionized water (25 ml) in a 100 mL round-bottom flask. The reaction mixture was purged with argon for 15 mins to remove oxygen. Then, the polymerization was carried out at 70° C. in an oil bath while stirring at 200 rpm for 36 h. After the polymerization, the particles were washed three times via centrifugation at 12500 rpm with EtOH/water mixture (1/1 by volume), the centrifugation requires 7 mins for each run.

Coating formulation of amphiphilic Janus nanoparticles with phosphate microparticles: Coating formulation were prepared by mixing 10 wt % amphiphilic Janus nanoparticles (0.1 g/ml) and 90 wt % phosphate microparticles (0.1 g/ml) in EtOH/water mixture (1/1, by volume). After 10 mins sonication under water bath, 300 µL mixed particle dispersion was drop coated on top of the plasma cleaned stainless steel (1 cm×1 cm) and dried under the room temperature overnight.

Coating formulation of amphiphilic Janus nanoparticles with commercial primer: The stainless steel (1 cm×1 cm) were pre-coated with 300 µL commercial primer, after fully dried under the room temperature, coating formulation were prepared by mixing 15 wt % amphiphilic Janus nanoparticles and 85 wt % commercial primer (diluted with deionized water at 15 wt %). After 10 mins sonication under water bath, 300 µL mixed coating were drop coated on top of pre-coated stainless steel (1 cm×1 cm).

Characterization of Materials: Fluorescent labeling of phosphate binder particles and amphiphilic Janus particles was conducted by immersing phosphate particles into FITC ethanol solution and amphiphilic Janus particles into Nile red ethanol solution. Excess FITC/Nile red molecules were removed by repeated washing with DI-water by centrifugation for more than five times. Stratification evolution and stacks of plane images at varying depths within the coating formulation was monitored using Zeiss 780 confocal microscope with excitation wavelength of 488 nm for FITC and 561 nm for Nile red. A second-order polynomial equation was fit to the detected intensity as a function of depth from the surface, which was then used to define a baseline, to correct for the depth dependence of the detected intensity. The shape and morphology of the particles were observed by scanning electron microscope (FEI Quanta 250) at an accelerating voltage of 10 kV, an optical fluorescent microscope (Leica DMi8) was used to capture the bright-field image. Samples were prepared by scratching small pieces of coating film off from the substrate and then mounting them on a vertical sample stage. The cross-section of coating film was imaged under the scanning electron microscope (FEI Quanta 250) at an accelerating voltage of 10 kV. The surface topology was imaged by a Confocal-laser 3D scanning microscope (Keyence).

The static contact angle of one water droplet (~5 µl) on the coating surface was measured on an optical tensiometer contact angle measuring system (Dyne Technology) at room temperature (25° C.). The contact angle was repeated three times at different sites on the same surface side. The 1 cm×1 cm formulated coating surface was rinsed with organic solvent EtOH and THF (90/10 by volume) for 1 min as one 1 cycle. The water contact angles were measured after each 5 cycles of rinsing.

Force curve measurements was performed in contact mode AFM using cantilever deflection. Bruker Dimension Icon AFM was used in Air Contact mode with Bruker SNL-10 AFM tips. The cantilever's spring constant, k=0.47 N/m, was determined by thermal tune calibration method built into the nanoscope software. Average rupture force values were obtained based on thirty-eight measurements from each of three different locations per sample.

Analysis of the Results

Janus particles are formulated as a straightforward drop-in additive that can be directly applied to the waterborne latex coating system. This means our method is fully compatible with current commercial products, and only a relatively small quantity of Janus particles are needed to cover the surface and change the surface-related coating properties (FIG. 1a). The bulk materials of the coating film remain intact, which helps maintain the coating performance that is unrelated to surfaces. The disclosure allow for manufacturers can quickly adapt the new method by simply adding Janus particles in their product lines, without having to redesign the current coating system.

Figure 1B:
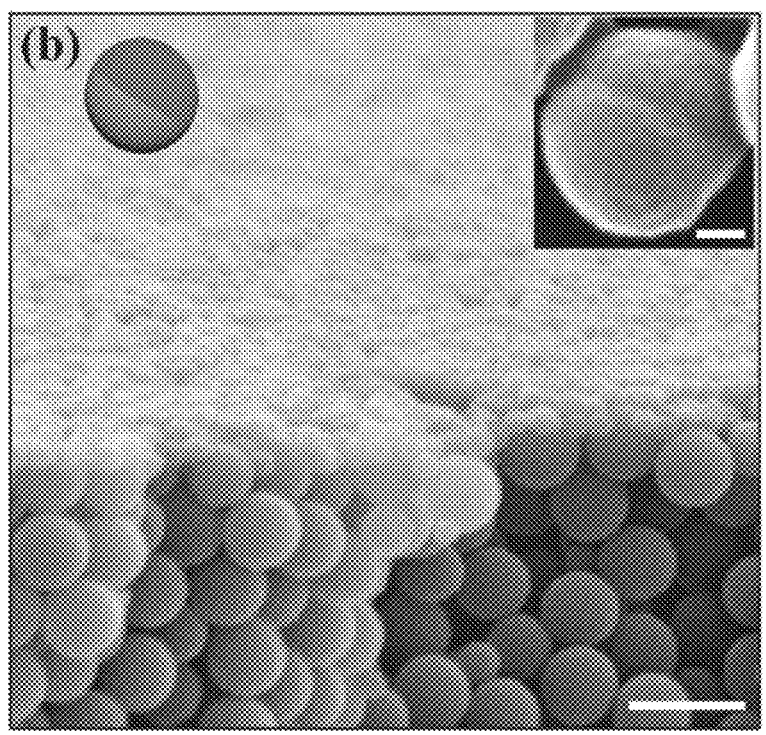
FIG. 1B is a SEM image of the cross-section view of dried coating structures (scale bar is 2 µm). Inset shows the asymmetric morphology of a typical Janus particle with Janus balance (JB), percentage of hydrophobic surface area, ~50% (scale bar is 100 nm)
Figure 1C:
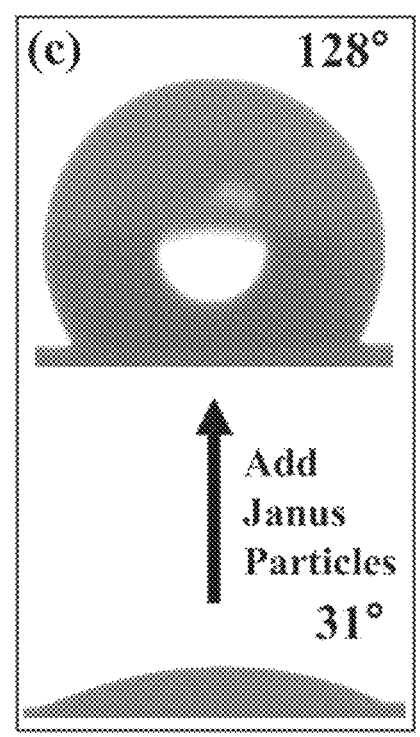
FIG. 1C shows the contact angles of the coating surface before and after adding the Janus particles. d-f) SEM images of the cross-section view of coating structures added with homogeneous particles and Janus particles of different JBs.
Figure 1D:
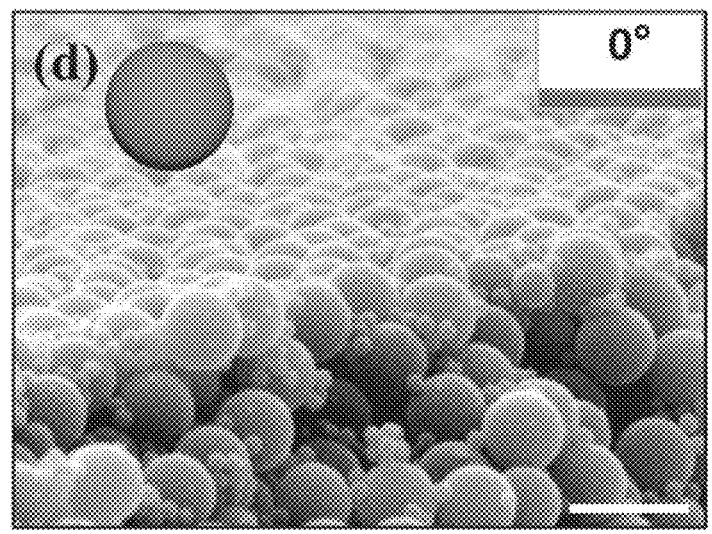
FIG. 1D shows homogeneous hydrophilic particles.

We tested the active stratification of Janus particles with both the binder particles synthesized in our lab and a commercial primer. Both experiments demonstrated clear stratification of Janus particles at the coating surface. Our binder particles were homogeneous polystyrene particles functionalized with phosphate functional groups through co-polymerization (FIG. 6). Phosphate is a known adhesion promoter and the binder particles were designed to provide strong adhesion performance. In a typical experiment, a small number of Janus particles (10% by dry weight) were mixed with binder particles. Ethanol was introduced to help disperse the particles and increase the rate of the evaporation. Electron microscopy images (FIG. 1b-f) clearly show the distribution of amphiphilic Janus particles (400 nm) of different Janus balances (JBs) in the mixtures with homogeneous binder particles (1.3 µm) after the coating film is dried. FIG. 7 shows the details of the morphology of these Janus particles. FIG. 1b shows that a densely packed monolayer of Janus particles self-stratified on top of the homogeneous binder particles, while FIG. 1d shows homogeneous hydrophilic particles of similar size failed to stratify. This indicates that the Janus geometry is responsible for the self-stratification. Due to the weak contrast between two surfaces of polymeric Janus particles under the electron microscope, it is very challenging to directly observe the orientation of Janus particles at the interface. However, the water contact angle of the coating surfaces increased from 31° to 128° after adding Janus particles (FIG. 1c). Since the coating made with pure hydrophobic particles of the same surface chemistry has a contact angle of 131°, the contact angle increase provides the clear evidence that Janus particles orient with their hydrophobic side towards air.

Figure 1E:
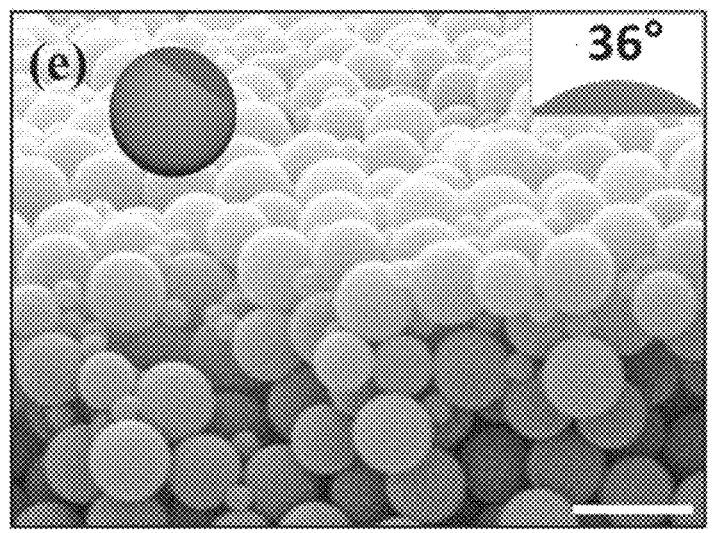
FIG. 1E shows amphiphilic Janus particles with JB ~20%.
Figure 1F:
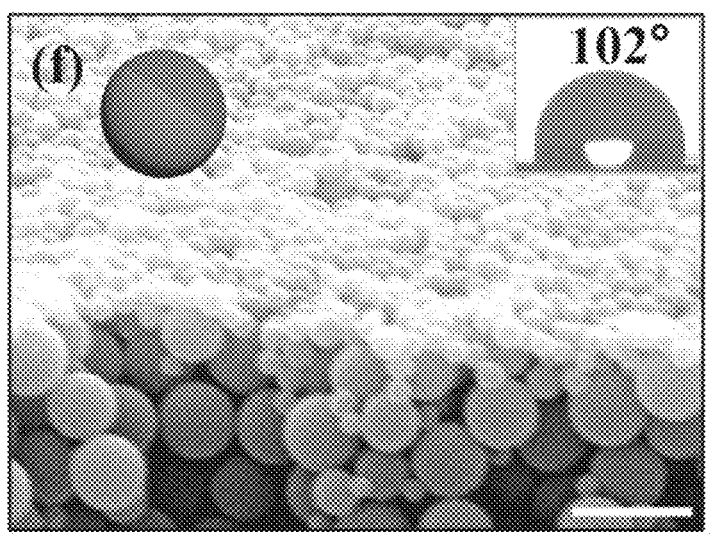
FIG. 1F Amphiphilic Janus particles with JB ~40%. Insets show the corresponding contact angles of the coating surfaces (scale bars are all 2 μm).

In addition, particles with different JB also demonstrated different stratification behaviours. Janus particles with low Janus balance (20% of surface area is hydrophobic) did not stratify at all (FIG. 1e). Janus particles with bigger hydrophobic patches (Janus balance of 40%) showed stratification (FIG. 10, however, a small fraction of coating surface was not covered by Janus particles and the stratification is less complete than that of Janus particles with JB of 50% (FIG. 1b). The observation at single particle level correlates very well with the contact angle measurement shown in the insets. These results suggest that adsorption energy, which is determined by the JB, plays an important role in active self-stratification. When adsorption energy is small (JB of 20%), no stratification will occur, while larger adsorption energy (JB of 50%) will lead to the most complete stratification.

Figures 2A, 2B, 2C:
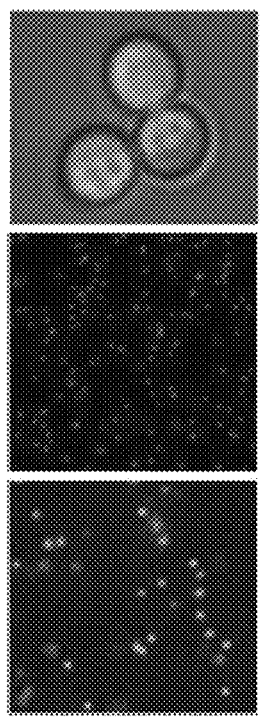
FIG. 2A shows Amphiphilic Janus particles (3 μm) labeled with Nile red.
FIG. 2B shows Amphiphilic Janus particles (400 nm) labeled with Nile red.
FIG. 2C shows Homogeneous binder particles (1.3 μm) labeled with green FITC.
Figure 2D:
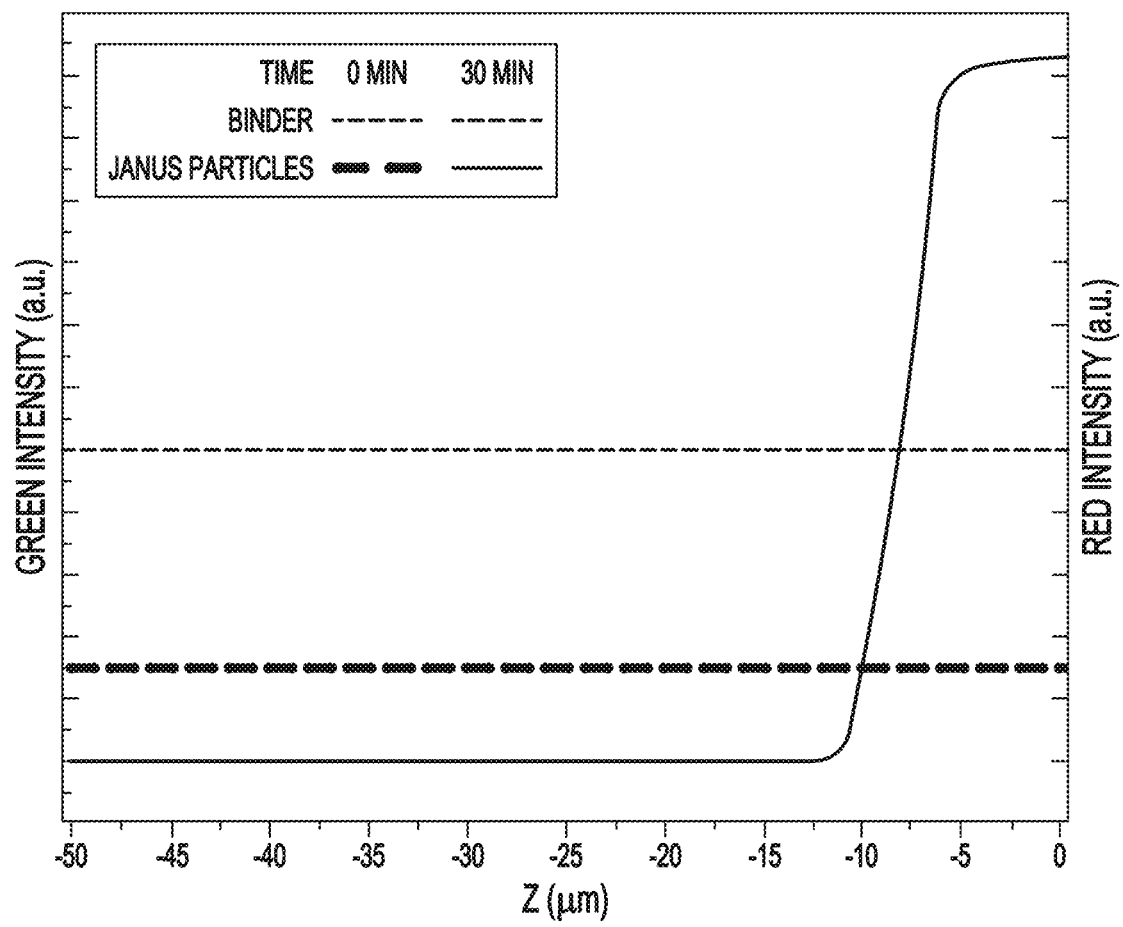
FIG. 2D shows integrated intensities Janus particles and binder particles channels as a function of the vertical distance z. The surface is set at z=0.

Confocal fluorescent microscopy was utilized to further reveal the kinetics of the active self-stratification process. The amphiphilic Janus particles were labelled with a red fluorescent hydrophobic dye (Nile red) and the hydrophilic binder particles were labelled with a green hydrophilic dye (fluorescein isothiocyanate (FITC)). Larger Janus particles (3 µm) were synthesized to demonstrate the dye labelling and distribution inside Janus particles. FIG. 2A shows the hydrophobic sides of Janus particles were selectively labelled with Nile red. Such fluorescent labelling via hydrophobic interaction is highly stable and the dispersity of labelled Janus particles remains unchanged (FIG. 2B). For contrast, hydrophilic phosphate particles were selectively labelled with hydrophilic FITC (FIG. 2C) through conjugation. Before the observation, Janus particles and phosphate binder particles were completely mixed under sonication and loaded into a closed chamber. Two different experiments were then carried out to study the kinetics of the active self-stratification process. In the open-lid experiment, evaporation was allowed during the observation. In the closed-lid experiment, evaporation was negligible during the observation. The distribution of two types of particles were non-invasively probed using confocal laser scanning microscopy with two excitation wavelengths. It is worth noting that in the open-lid experiment, amphiphilic Janus particles stratified quickly and exclusively to the top of the solution and formed a thin layer (within 2 minutes). The stratification was completed within just a single confocal scan. Due to the speed limit of confocal scan, the kinetics of the active self-stratification could not be examined in detail. In a closed-lid experiment with negligible evaporation, it was discovered that the active self-stratification still happened, albeit slowly. The analysis of the confocal scans in the closed-lid experiment reveals that the binder particles remain evenly distributed across the coating suspension. However, Janus particles gradually self-stratified to the top surface within 30 min as shown in FIG. 2D. The concentration plateau within 5 μm of the top surface is likely due to the resolution limit of the confocal scan.

Figure 9A:
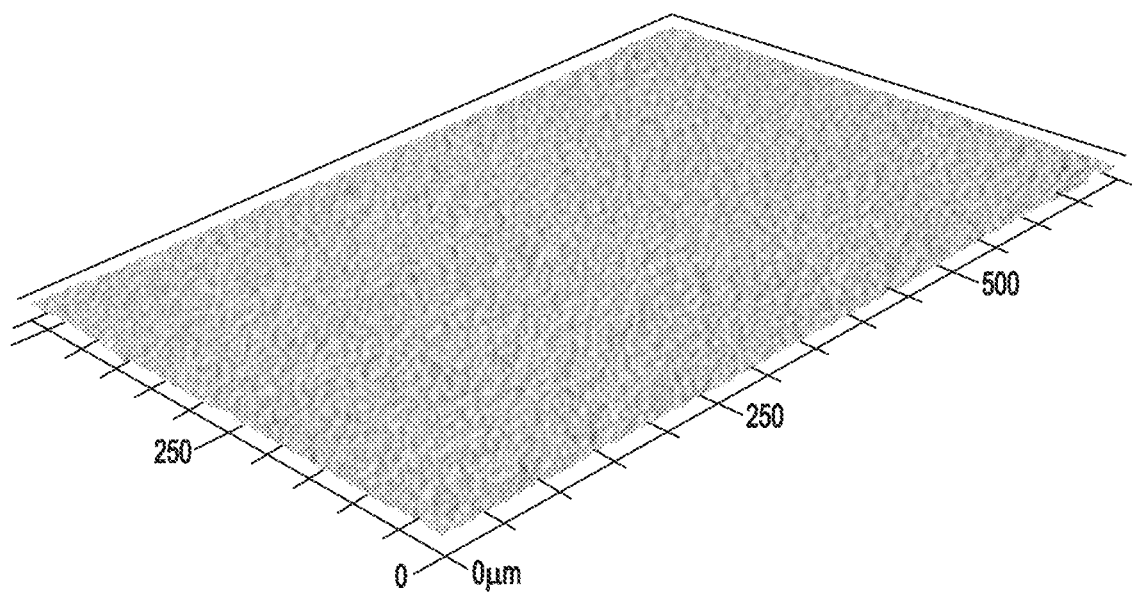
FIG. 9A shows the surface topology of stratified coating composed of amphiphilic Janus particles and phosphate binder particles.
Figure 9B:
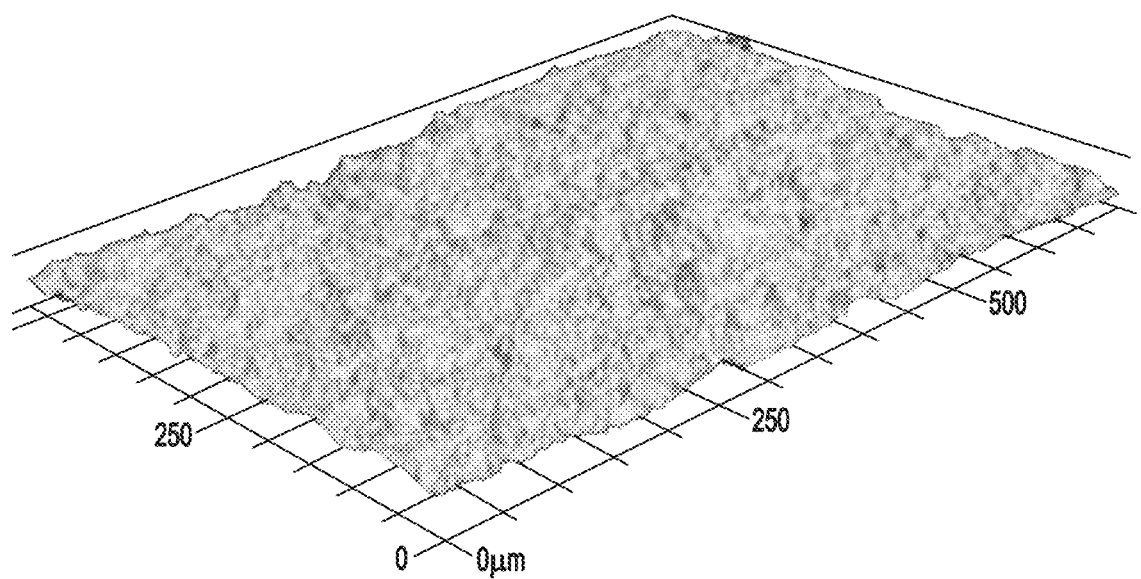
FIG. 9B shows the surface topology of non-stratified coating composed of hydrophobic tetradecyl acrylate particles and phosphate binder particles

The active self-stratification of amphiphilic Janus particles is drastically different from previously reported self-stratification of homogeneous particles. Previous studies on homogeneous particles suggest that particle size is a major factor contributing to the stratification. However, our experiment with smaller homogeneous particles did not show stratification at all. Two smaller homogeneous particles (80 nm and 200 nm) with different surface chemistries were synthesized and mixed with binder particles. As shown in FIG. 8 no stratification was observed. These results suggest that the active self-stratification of Janus particles is due to the strong adsorption at the interface. Furthermore, surface adsorption energy alone could not completely explain the fast self-stratification of Janus particles under the evaporation. No self-stratification was observed for suspensions containing only Janus particles without binder particles (FIG. 9).

Figure 10A:
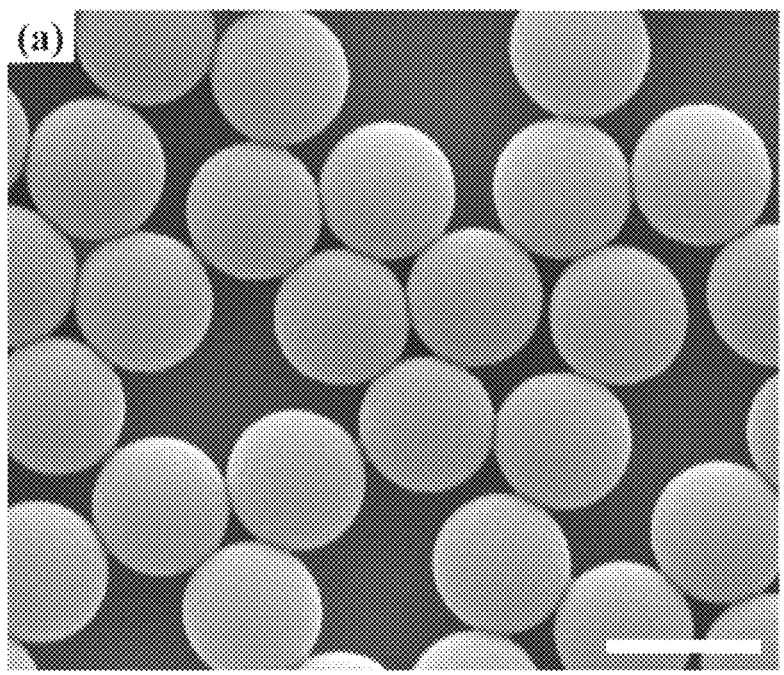
FIG. 10A shows SEM images of 880 nm PS-co-PVA hydrophilic seed particles.
Figure 10B:
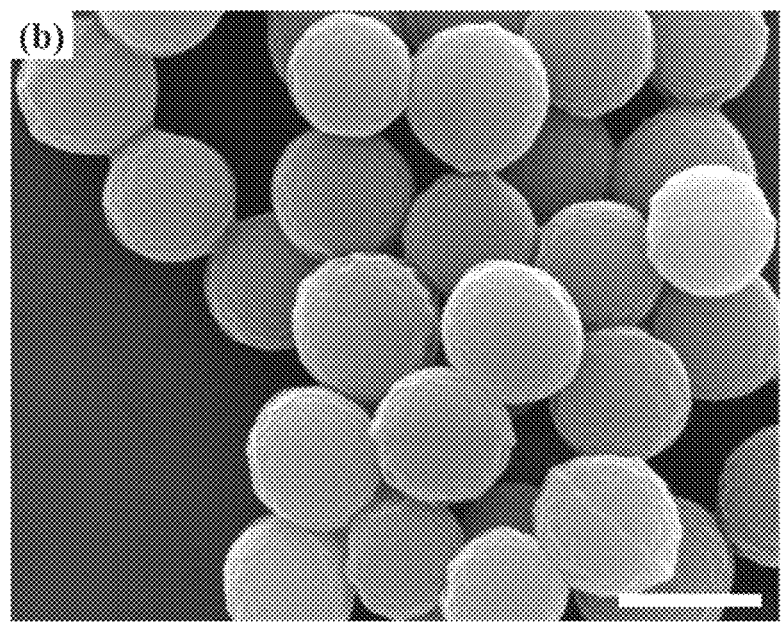
FIG. 10B shows SEM images of 1 μm amphiphilic Janus particles. Scale bars are all 1 μm.

Initially, Janus particles are evenly distributed throughout the solution and their concentration near the interface is much lower than that of the binder particles (FIG. 10). However, Janus particles accumulate rapidly near the interface and their concentration exceeds the concentration of homogeneous particles by two orders of magnitude within 15 mins of drying time. FIG. 10 also predicts the depletion of binder particles at the interface driven by the significant concentration gradient of self-stratified Janus particles at the interface. In contrast, the concentrations of both homogeneous and binder particles concurrently increase towards the interface under evaporation with no stratification observed. Notably, this theoretical model is limited to predict the kinetics of active self-stratification at low particle concentrations, therefore unable to capture the progression of stratification through the dense regime towards dense packing. However, the model can be applied to analyse the early stage of stratification when particle concentrations are relatively low. The stratified structure formed at the dilute regime would persist over to higher concentrations, which will subsequently lead to the Janus-on-top structure in the final film.

Figure 11:
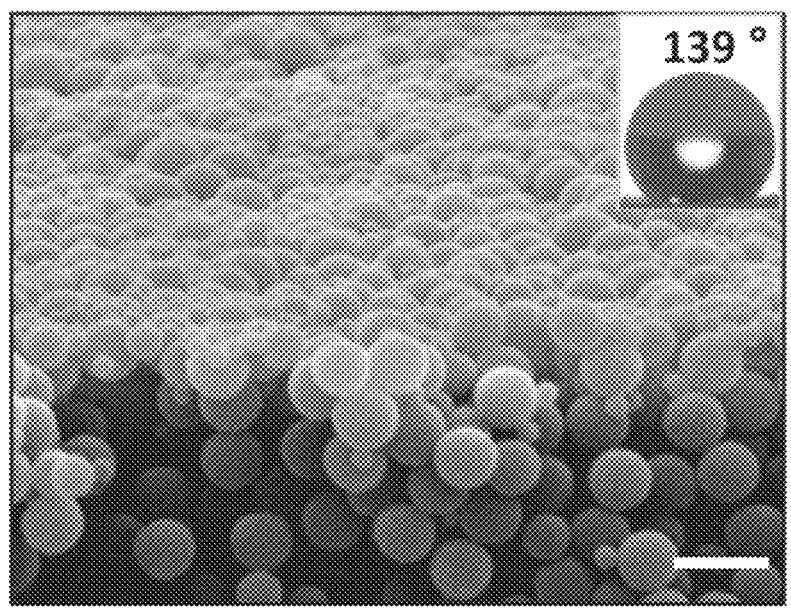
FIG. 11 shows SEM images of coating structures of binder particles added with two Janus particles of different sizes (1.1 μm and 400 nm). Inset is contact angle of the coating surface. Scale bars is 2 μm.

Commercial coatings are usually formulated at pH ~9-11, so binder particle surfaces are rendered with negative charges using acrylic chemistry. Indeed, Janus particles showed the most successful stratification under these conditions as shown in FIG. 11. On the other hand, results in FIG. 11 also indicate many factors may affect the self-stratification, such as pH, binder particle surface charge, and even the concentration of Janus particles. While the high adsorption energy of Janus particles at the interface clearly provides a driving force, the detailed mechanism for active self-stratification can be rather complicated. A thorough understanding requires more detailed studies together with theory and simulation, which is beyond the scope of this paper. Here we only provide a possible explanation that accounts for our observations regarding pH, surface charge of binder particles and Janus particle concentration. It has been reported that negatively charged particles may be repelled from water-air interface due to the image charge. Since binder particles have a strong negative charges under high pH, the repulsion may create a depleted zone of binder particles near the interface. This in turn creates a positive osmotic pressure that pushes the neutral amphiphilic Janus particles towards the interface. The quick adsorption of Janus particles at the interface further sustains this osmotic pressure until most of the Janus particles from the bulk diffuse towards and adsorb at the interface. The surface charge of binder particles also affect the particle-particle interactions and could influence the stratification behavior considerably. When Janus particle concentration is higher than their critical micelle concentration, they may self-assemble into clusters, similar to micelles formed by surfactant molecules. The self-assembled clusters are known to change the kinetics and coating behaviors. The clusters will slow down the diffusion and change the surface adsorption behaviors of Janus particles, which will eventually prevent the stratification from happening. FIG. 11 indeed shows severe aggregation of Janus particles in the bulk when Janus particle concentration is high (30% of the total dry weight).

Figure 3A:
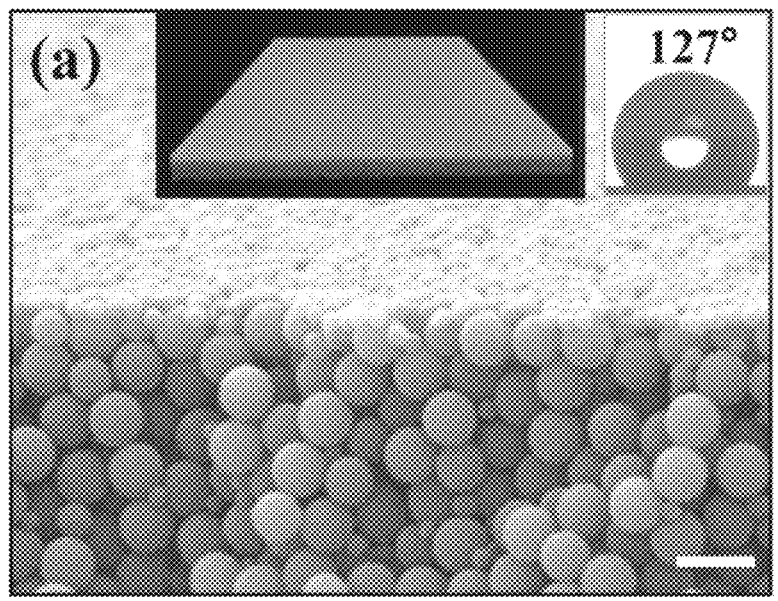
FIGS. 3A-D show SEM images and photos of the dried coating films after rinsing with the organic solvent (THF)
Figure 3B:
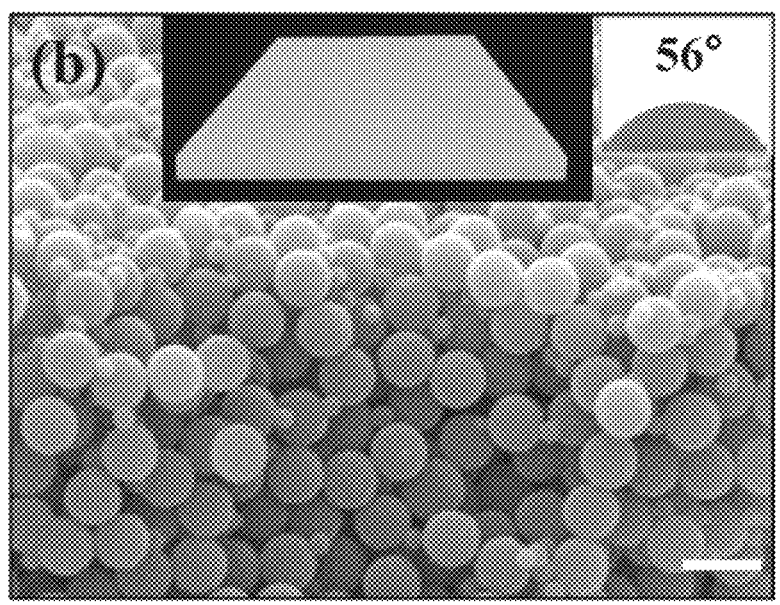
Figure 3C:
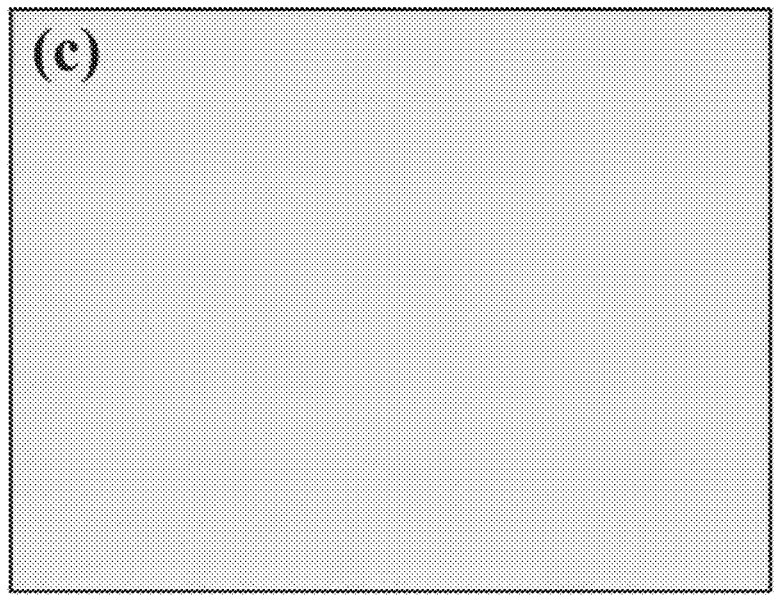
Figure 3D:
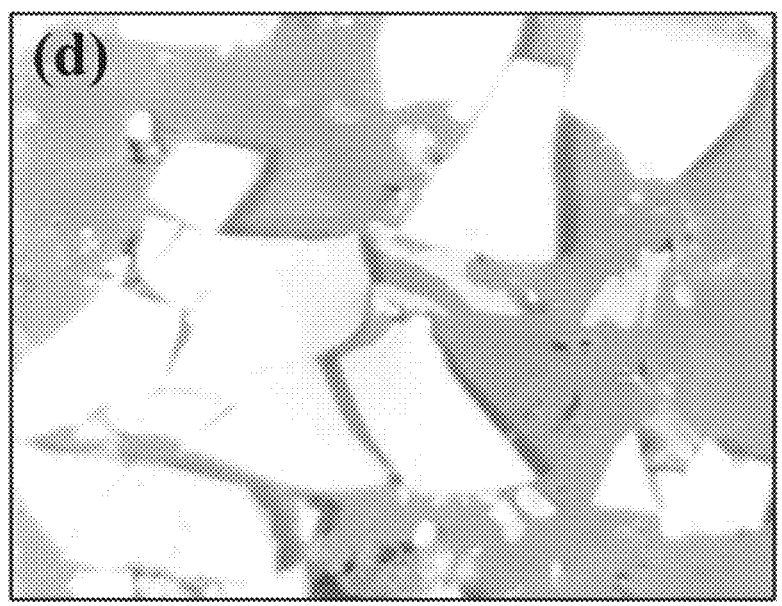

To investigate the durability of the self-stratified coating surface with Janus particles, organic solvents (EtOH/THF, 90/10 by volume) were used to rinse the surface of the coating films. Coating films formed by mixing homogeneous hydrophobic particles (of the same hydrophobic surface as the Janus particles) and phosphate binder particles were chosen as a control. Images of the cross-sections of the coating films after rinsing in FIG. 3 clearly demonstrates that the self-stratified coating surface maintain their structure integrity, and surface hydrophobicity is unchanged. The resistance highlights the completeness of the densely packed monolayer of amphiphilic Janus particles formed during the self-stratification process and the strong adhesion offered by the phosphate binder particles. In comparison, the control sample that does not possess the stratified structures (FIG. 3b) was destroyed in rinsing with solvent (FIG. 3d). Since the hydrophobic homogeneous particles randomly dispersed within the binder matrix, they acted as the defects and significantly weakened the coating integrity and adhesion. Another interesting observation of the coating films formed by active self-stratification is that these films with Janus particles present a flatter surface compared with the films with only homogenous particles (FIG. 12). Previous studies suggest that Janus particles may strongly interact with each other at the interface through capillary attraction and form a strong network. This densely packed network may taper down the fluctuation of the interface.

Figure 13A:
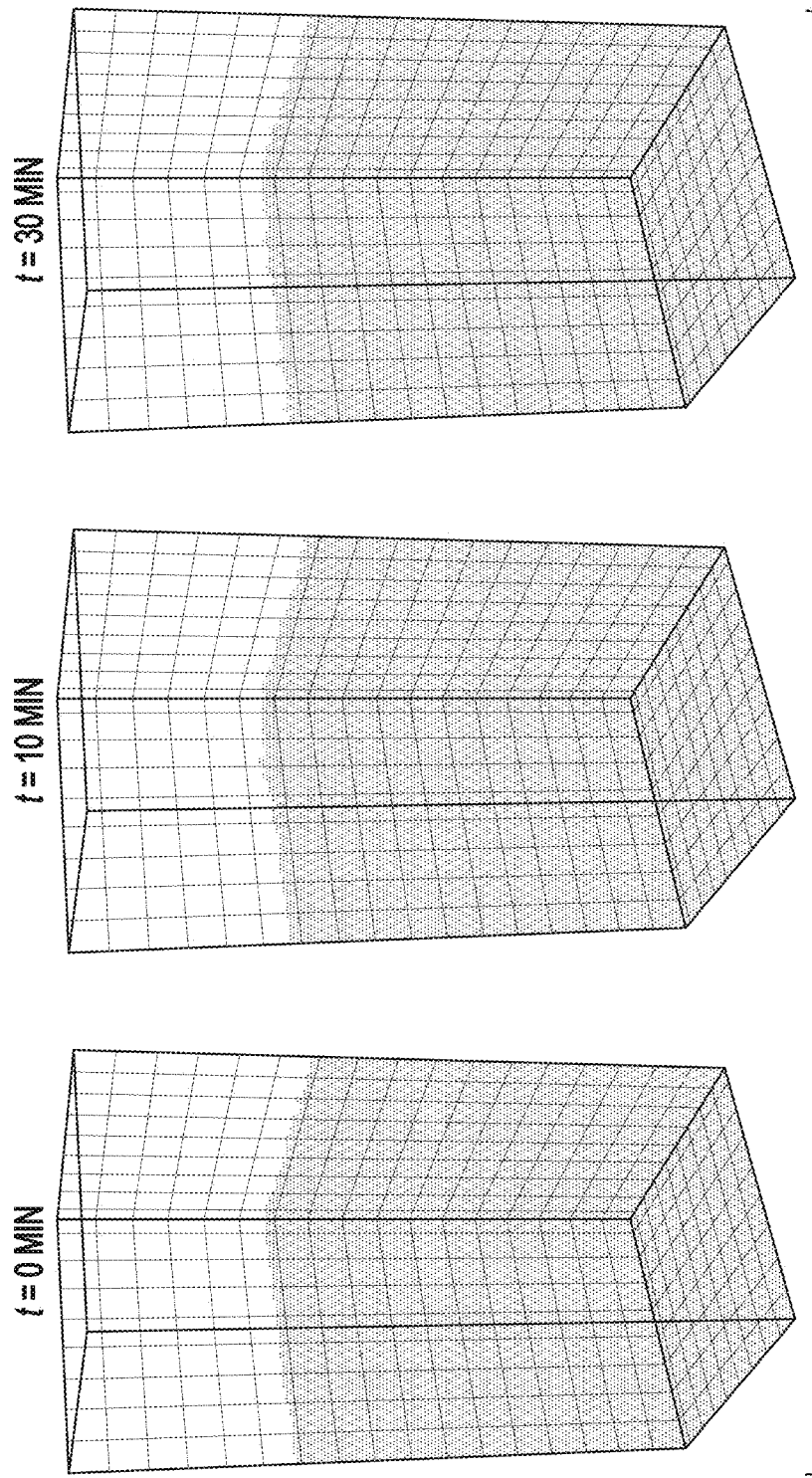
FIGS. 13A-B show fluorescent confocal microscopy images of particle dispersion composed of amphiphilic Janus particles labeled with Nile red at different time points FIG. 13A without evaporation (close-lid).
Figure 13B:
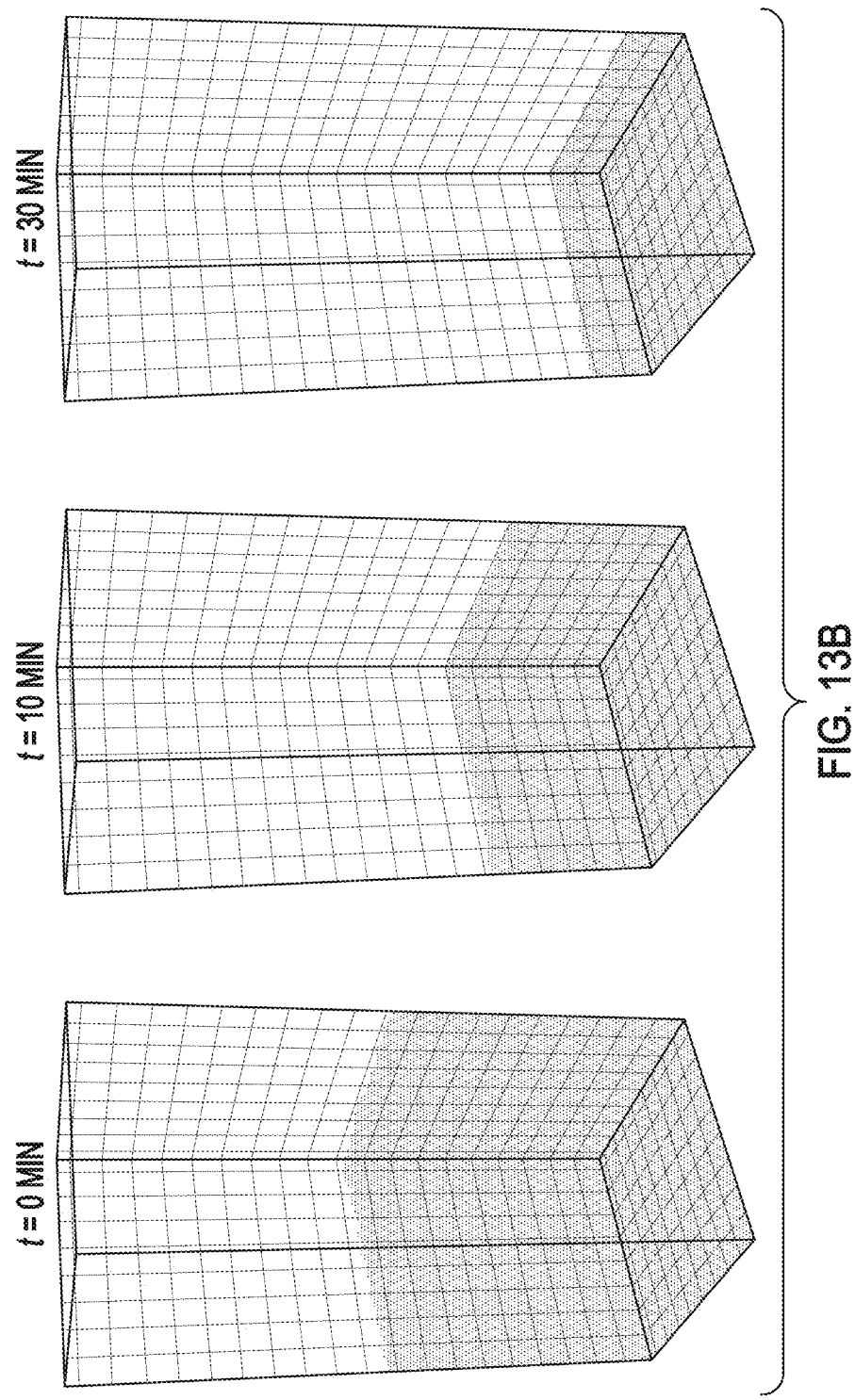

The active self-stratification of Janus particles also offers a novel approach to modulate the nanoscale roughness of the coating surface. It has been well-recognized that higher surface roughness will enhance the water contact angle of hydrophobic surfaces. We altered the surface roughness by introducing bigger Janus particles (1 μm) (FIG. 13) to co-stratify with smaller Janus nanoparticles (400 nm). Both particles self-stratified to the interface. Bigger particle size and size mismatch with small particles increased the surface roughness, and a higher water contact angle of 139° (Fig. S10) was achieved.

Figure 4A:
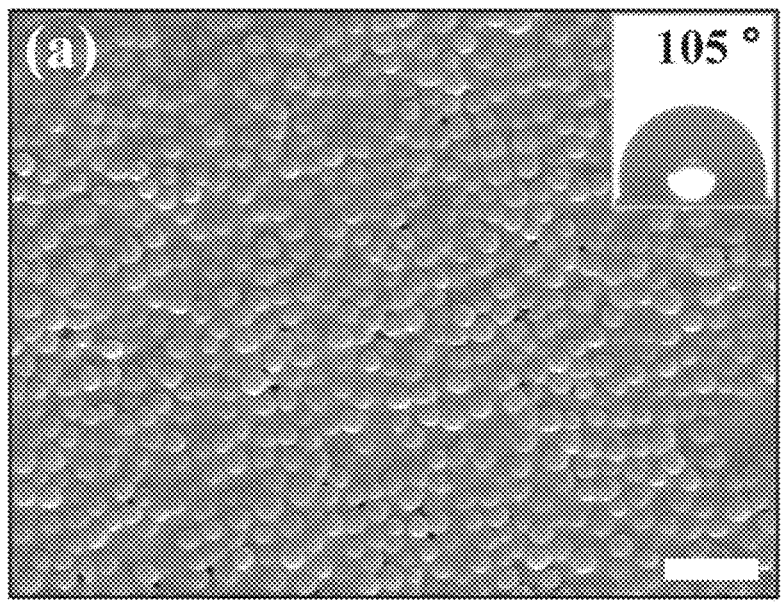
FIGS. 4A-C show SEM images of coating films formed by commercial primer binder added with Janus particles, and force profiles measured on film surfaces using AFM.
Figure 4B:
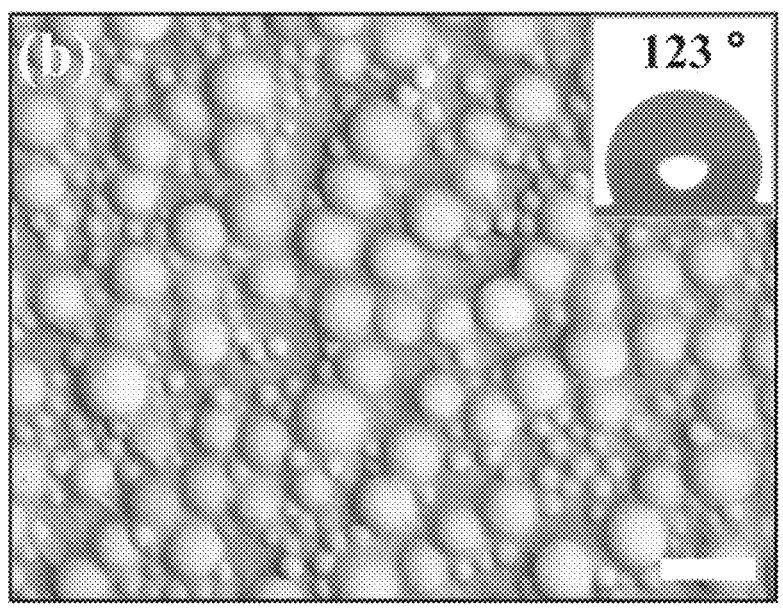
Figure 4C:
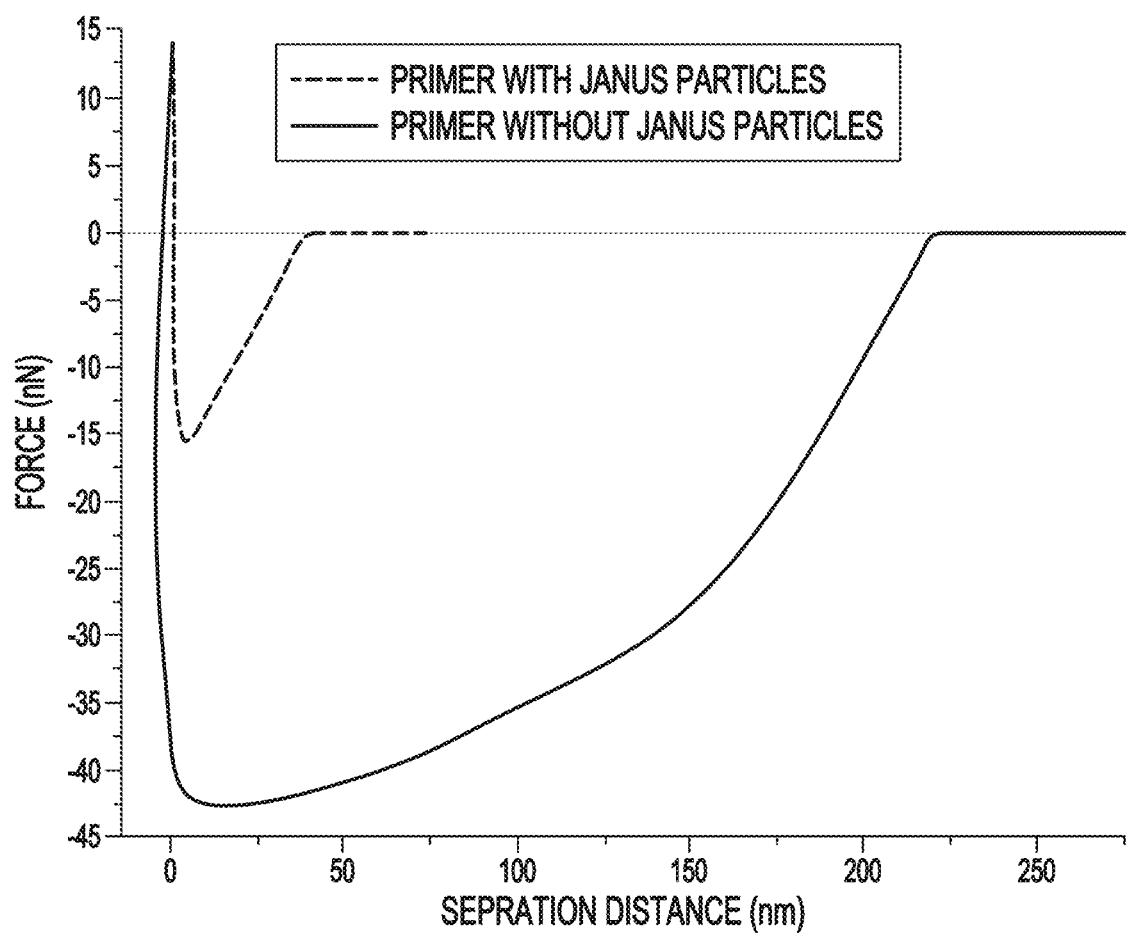
Figure 5A:
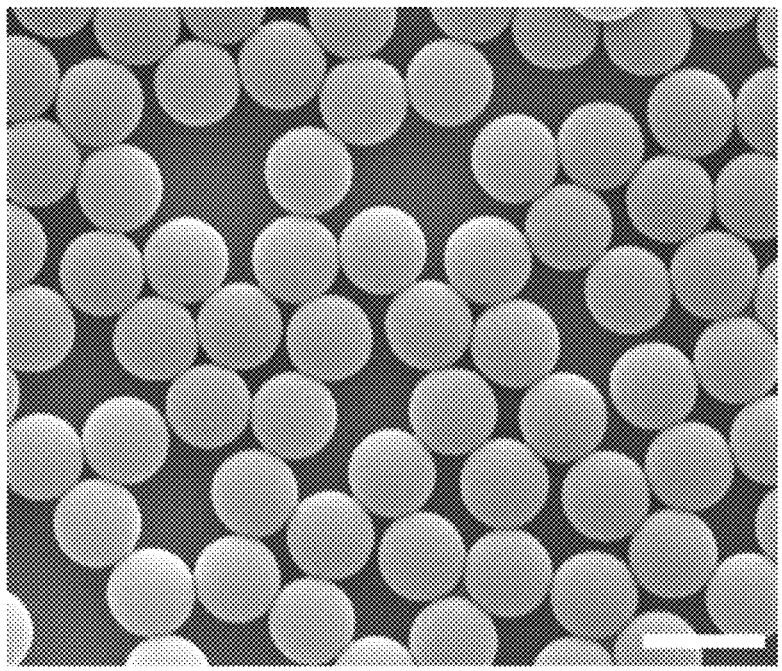
FIG. 5A shows SEM images of PS-co-PVA hydrophilic seed nanoparticles.
Figure 5B:
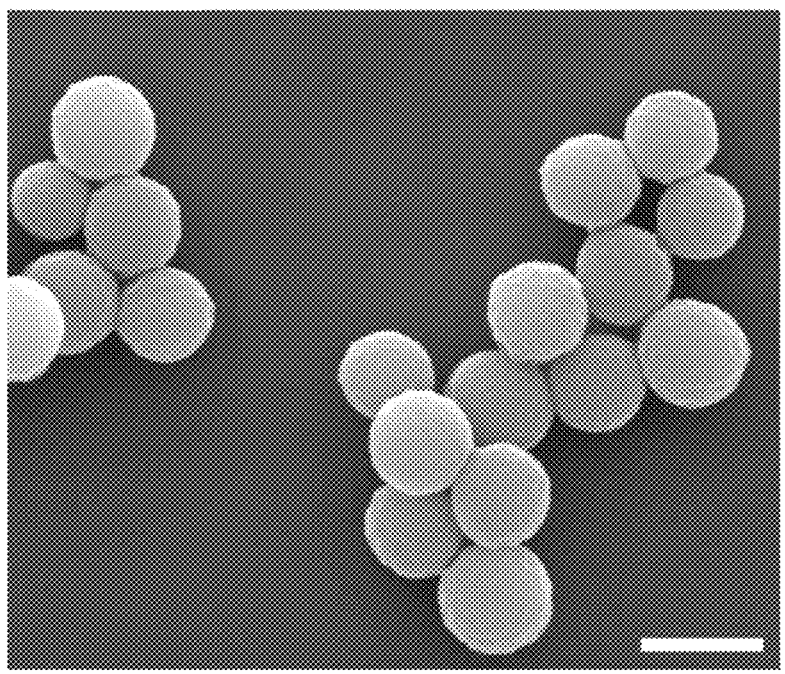
FIG. 5B shows SEM images of amphiphilic Janus particles. Scale bars are all 500 nm.
Figure 8A:
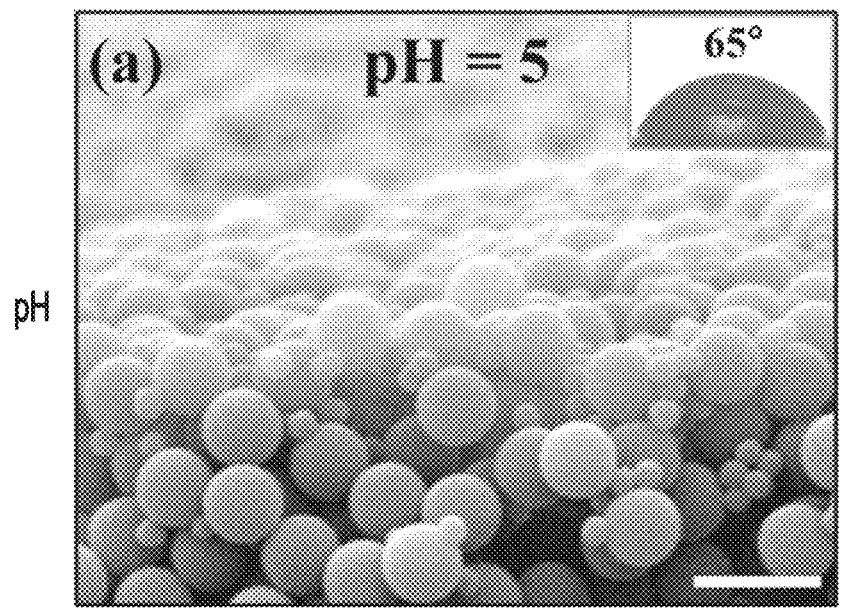
FIGS. 8A-B show the impact of solvent pH on the coating structure.
Figure 8B:
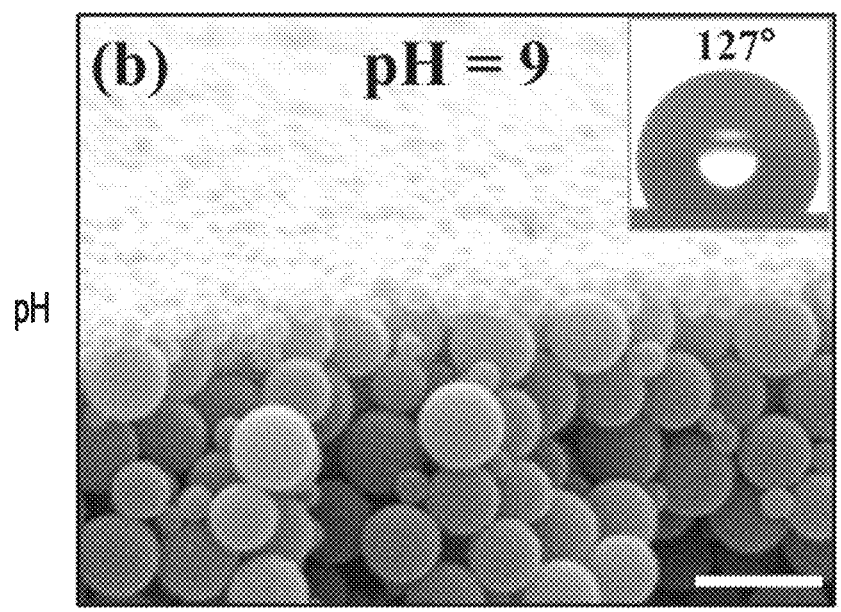
Figure 8C:
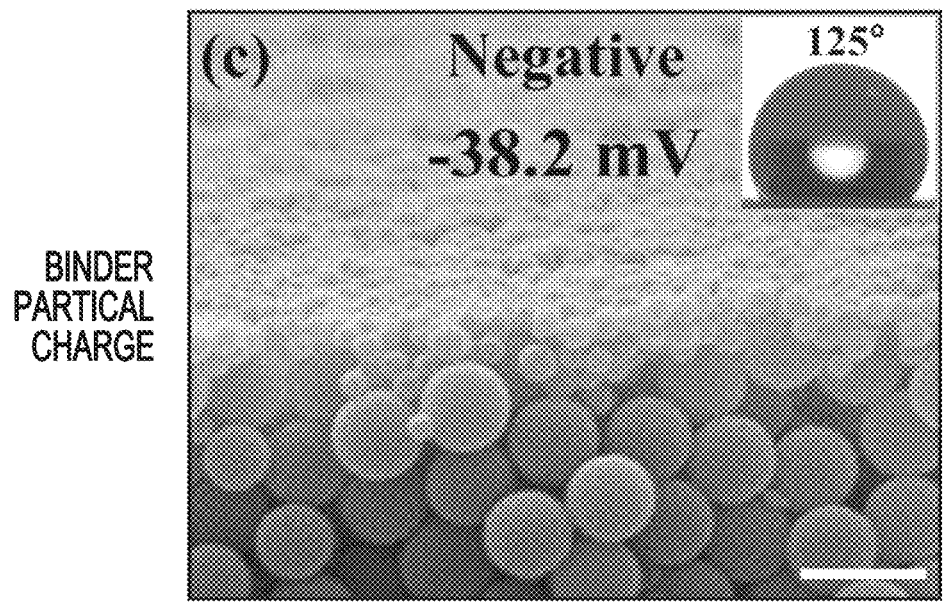
FIG. 8C-D show the impact of binder particle charge on the coating structure. Inset is contact angle of the coating added with corresponded particles.
Figure 8D:
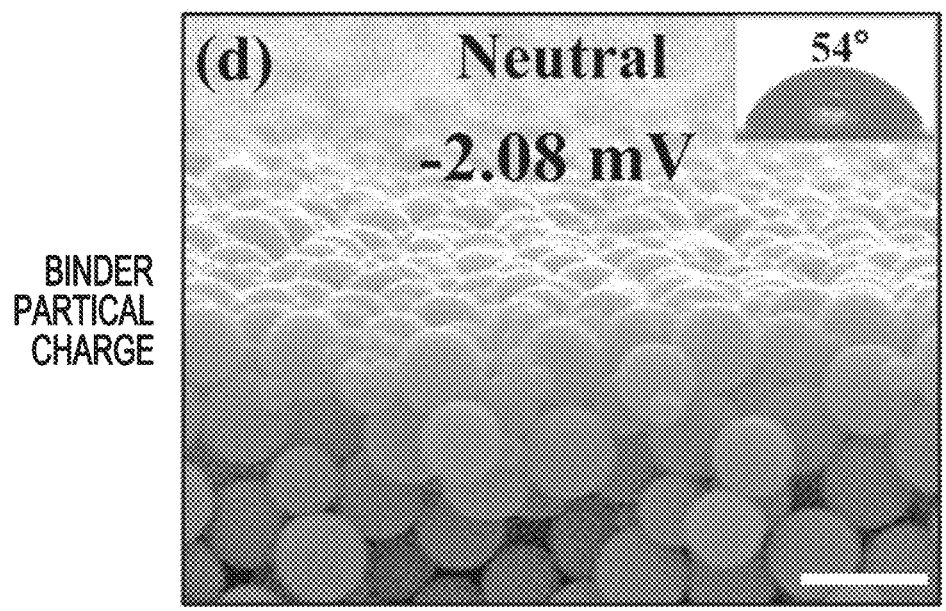
Figure 8E:
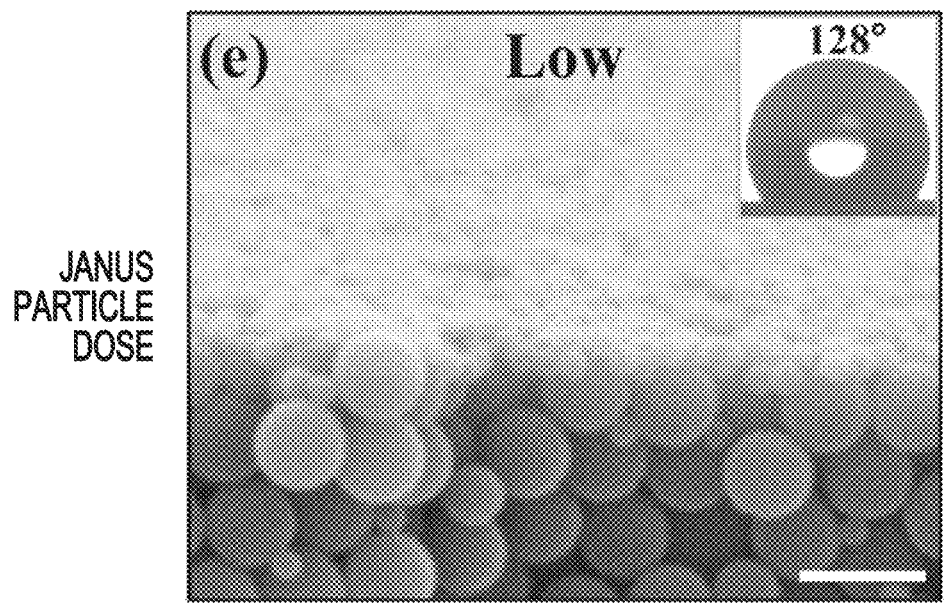
FIG. 8E-F show the impact of amphiphilic Janus particle concentration on the coating structure. Scale bars are all 2 μm.
Figure 8F:
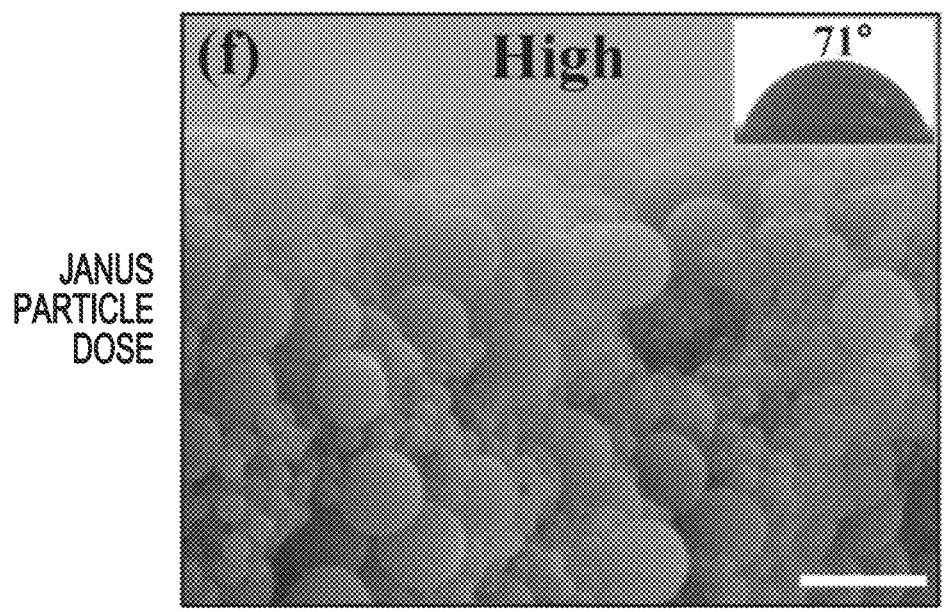

To further test Janus particles with commercial coating products, Janus particles were applied to a common commercial primer. Since commercial coating formulations usually contain many surface-active ingredients beyond simple binder particles, they may interact with Janus particles and interfere with the process. The successful stratification demonstrates the easy integration of our method into existing products. Janus particles (15% by dry weight) was directly added to the commercial primer. The details of the procedure are described in the experimental section in the Supporting Information. FIG. 4a clearly shows self-stratification of Janus particles at the surface of the commercial primer coating. Since the primer binder particles have a $T_g$ much lower than the room temperature, they form a continuous film after coating film is dried. Most of the coating surfaces were covered with self-stratified Janus particles and the contact angle was increased from 0° to 105°. Introducing bigger Janus particles to increase roughness further increased the water contact angle to 123° (FIG. 4b). In order to characterize the mechanical properties of the surface, measurement of the surface forces was carried out using AFM (atomic force microscopy). The force-distance curve during retraction of AFM tip from the surface of the primer coating without adding Janus particles in FIG. 4c shows strong adhesion of the top layer (sticky surface). This is expected since the function of the primer is to provide adhesion as a base coat. For the real coating applications, this also means that the primer coating surface is tacky to touch. Without a topcoat, the surface may have poor hardness, stain resistance and dirt pick-up performance. With Janus particles added to the primer formulation, the self-stratified coating showed lower adhesion of top layer, i.e. less sticky surface. The average value of rupture force of a tip from the primer surface was reduced to ~⅓ (from 42 nN down to 16 nN) and the range was reduced to ~⅐ (from 210 nm to 30 nm). This demonstrates that Janus particles can not only render the hydrophilic coating film into hydrophobic surface, but also effectively improve the surface properties, such as hardness and tackiness of a commercial product. One advantage of our new approach is that Janus particle additive can be directly applied to coating product without the need to alter the current binder chemistry or coating formulation. The important properties of coating materials, including film formation and dispersion stability, are intact. This method offers a new strategy and more latitude in designing Zero-VOC paint with low $T_g$ binder while maintaining the surface properties.

Incorporating fluorinated monomer can enhance the water-repellency of amphiphilic Janus particles. Due to the strong hydrophobic properties of trifluoroethyl methacrylate monomers, SDS and OP-10 were added with PVA and Pluronic F-127 to stabilize the monomer emulsions, the SEM images of FIG. 14 demonstrate that after carefully adjusting the fluorinated monomer to seed particles ratio, amphiphilic Janus particles with PTFEMA as the hydrophobic lobe can be successfully synthesized.

To further expand the size availabilities of amphiphilic Janus particles, SDS and DVB were applied into the seed synthesis procedure, as shown in FIG. 15, hydrophilic seed particles with 20 nm to 300 nm in diameters can be successfully fabricated. The 300 nm amphiphilic Janus particles made from 180 nm hydrophilic seed particles also demonstrate self-stratification capabilities, as shown in FIG. 16.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

EXEMPLARY EMBODIMENTS

The following exemplary embodiments are provided, the numbering of which is not to be construed as designating levels of importance:

Embodiment 1 provides composition comprising:
amphiphilic Janus particles; and
a waterborne binder;
wherein the particles are self-stratified.

Embodiment 2 provides the composition of Embodiment 1, wherein the Janus particles comprise:
a polymeric hydrophobic lobe; and
a polymeric hydrophilic lobe.

Embodiment 3 provides the composition of Embodiment 1 or 2, wherein the Janus particles are no more than 25 wt % of the composition.

Embodiment 4 provides the composition of Embodiments 1-3, wherein the Janus particles are less than 15 wt % of the composition.

Embodiment 5 provides the composition of Embodiments 1-4, wherein the Janus particles are less than 5 wt % of the composition.

Embodiment 6 provides the composition of Embodiments 1-5, wherein the Janus particles are between 1 and 5 wt % of the composition.

Embodiment 7 provides the composition of Embodiments 1-6, further comprising a co-solvent.

Embodiment 8 provides the composition of Embodiments 1-7, wherein the binder is a synthetic or natural resin.

Embodiment 9 provides the composition of Embodiments 1-8, wherein the binder is a primer product.

Embodiment 10 provides the composition of Embodiments 1-9, wherein the binder is an acrylic binder.

Embodiment 11 provides the composition of Embodiments 1-9, wherein the binder is a latex coating.

Embodiment 12 provides the composition of Embodiments 1-11, wherein the Janus particles comprise a PS-co-PVA side and a PTA side.

Embodiment 13 provides the composition of Embodiments 1-12, wherein the Janus particles have diameters between 100 nm and 500 nm.

Embodiment 14 provides the composition of Embodiments 1-12, wherein the Janus particles have diameters between 40 nm and 100 nm.

Embodiment 15 provides the composition of Embodiment 1-14, wherein the Janus particles are between 10 and 15 wt %.

Embodiment 16 provides a method of making the composition of Embodiments 1-14, comprising:
adding Janus particles to a waterborne binder.

Embodiment 17 provides the method of Embodiment 16, further comprising mixing, stirring, sonicating or shaking the composition.

Embodiment 18 provides the method of Embodiments 16-17, wherein the Janus particle are pre-mixed with a co-solvent prior to the addition of the particles to the waterborne binder.

Embodiment 19 provides a method of coating a surface, comprising treating the surface with a composition of Embodiments 1-15.

Embodiment 20 provides the method of Embodiment 19, wherein 10 wt % amphiphilic Janus particles and 90 wt % phosphate microparticles are mixed in a solvent.

Embodiment 21 provides the method of Embodiments 19-20, wherein the solvent is 1:1 EtOH/water mixture.

Embodiment 22 provides the method of Embodiments 19, wherein 5 wt % amphiphilic Janus particles and 85 wt % primer are mixed.

Embodiment 23 provides the method of Embodiments 19-22, further comprising sonicating the composition.

Embodiment 24 provides the method of Embodiments 19-22, wherein treating is drop coating.

Embodiment 25 provides the method of Embodiments 19-23, further comprising drying the surface.

Embodiment 26 provides a method of improving water resistance of a surface, comprising treating the surface with a composition of Embodiments 1-15.

Embodiment 27 provides a method of improving adhesion of a surface, comprising treating the surface with a composition of Embodiments 1-15.

Embodiment 28 provides a method of improving surface hardness of a surface, comprising treating the surface with a composition of Embodiments 1-15.

Embodiment 29 provides a method of improving film formation on a surface, comprising treating the surface with a composition of Embodiments 1-15.

Embodiment 30 provides a method of any one of claims 16-29, wherein the surface is wood, glass, metal, cement, concrete, paper, gypsum board, drywall, or plastic.

Embodiment 31 provides a method of improving skin, comprising treating the skin with a composition of Embodiments 1-15.

Embodiment 32 provides a method of synthesizing amphiphilic Janus particles comprising: i) making a hydrophilic seed, and ii) adding a monomer to the seed to form a hydrophobic lobe.

Embodiment 33 provides the method of Embodiment 31, wherein the hydrophobic seed is made from an acrylic monomer.

Embodiment 34 provides the method of Embodiment 32 or 33, the hydrophobic seed is made from styrene and vinyl acetate.

Embodiment 35 provides the method of Embodiments 32-35, wherein the hydrophobic seed is hydrolyzed.

Embodiment 36 provides the method of Embodiments 32-35, wherein the seed is made via dispersion polymerization.

Embodiment 37 provides the method of Embodiments 32-35, wherein the seed is made via emulsion polymerization.

Embodiment 38 provides the method of Embodiments 32-36, wherein step ii) is an emulsion polymerization.

Embodiment 39 provides the method of Embodiments 32-36, wherein the solvent is an alcohol/water mixture.

Embodiment 40 provides the method of Embodiments 32-36, wherein the amphiphilic Janus particles have diameters between 100 nm and 500 nm.

Embodiment 41 provides the method of Embodiments 32-36, wherein the amphiphilic Janus particles have diameters between 40 nm and 100 nm.

We claim:

1. A method of coating a surface, the method comprising:
   treating the surface with a composition that is an aqueous paint formulation or an aqueous primer, the composition comprising
      amphiphilic Janus particles comprising a polymeric hydrophobic lobe and a polymeric hydrophilic lobe, and
      a waterborne binder,
   wherein the particles are self-stratifying; and
   drying the composition on the surface, the drying comprising air drying, natural air drying, heated air drying, vacuum drying, freeze drying, supercritical drying, or a combination thereof;
   wherein
      the composition further comprises phosphate microparticles, or
      the polymeric hydrophobic lobe comprises a fluorinated acrylate polymer, or
      a combination thereof.

2. The method of claim 1, further comprising sonicating the aqueous paint formulation prior to the treating of the surface.

3. The method of claim 1, wherein treating is drop coating.

4. The method of claim 1, wherein the drying comprises air drying, natural air drying, heated air drying, or a combination thereof.

5. The method of claim 1, wherein the method improves water resistance of the surface, improves adhesion of the surface, improves surface hardness of the surface, or a combination thereof.

6. The method of claim 1, wherein the surface comprises wood, glass, metal, cement, concrete, paper, gypsum board, drywall, plastic, or a combination thereof.

7. The method of claim 1, wherein the composition further comprises the phosphate microparticles.

8. The method of claim 1, wherein the polymeric hydrophobic lobe comprises polymalic acid, polyaspartic acid, polyglutamic acid, polylysine, a fluorinated acrylate, butyl acrylate, stearyl acrylate, trifluoroethylmethacrylate, tetradecyl acrylate, or a combination thereof.

9. The method of claim 1, wherein the polymeric hydrophobic lobe comprises the fluorinated acrylate polymer.

10. The method of claim 1, wherein the polymeric hydrophobic lobe comprises polytetradecyl acrylate, poly(trifluoroethyl methacrylate), or a combination thereof.

11. The method of claim 1, wherein the polymeric hydrophilic lobe comprises a copolymer comprising polystyrene and polyvinyl alcohol.

12. The method of claim 1, wherein the polymeric hydrophilic lobe comprises a copolymer comprising polystyrene and polyvinyl alcohol, and wherein the polymeric hydrophobic lobe comprises a fluorinated acrylate, polytetradecylacrylate, or a combination thereof.

13. The method of claim 1, wherein the Janus particles are 1 to 15 wt % of the composition.

14. The method of claim 1, wherein the composition further comprises a co-solvent.

15. The method of claim 14, wherein the co-solvent comprises water, ethanol, or a combination thereof.

16. The method of claim 1, wherein the binder comprises a resin.

17. The method of claim 1, wherein the Janus particles have diameters of from 40 nm to 500 nm.

18. The method of claim 1, wherein the treated surface comprises at least 50% of the Janus particles thereon having their hydrophobic lobe oriented toward air.

19. A method of coating a surface, the method comprising:
- treating the surface with a composition comprising
  - amphiphilic Janus particles comprising a polymeric hydrophobic lobe and a polymeric hydrophilic lobe,
  - phosphate microparticles, and
  - a waterborne binder,
- wherein the particles are self-stratifying.

20. A method of coating a surface, the method comprising:
- treating the surface with a composition comprising
  - amphiphilic Janus particles comprising a polymeric hydrophobic lobe and a polymeric hydrophilic lobe, wherein the polymeric hydrophobic lobe comprises a fluorinated acrylate polymer, and
  - a waterborne binder,
- wherein the particles are self-stratifying.

* * * * *

UNITED STATES PATENT AND TRADEMARK OFFICE
CERTIFICATE OF CORRECTION

PATENT NO. : 12,023,641 B2  
APPLICATION NO. : 18/150054  
DATED : July 2, 2024  
INVENTOR(S) : Li et al.

Page 1 of 1

It is certified that error appears in the above-identified patent and that said Letters Patent is hereby corrected as shown below:

In the Specification

In Column 7, Line 21, delete "2, wt %," and insert --2 wt %,-- therefor

In Column 8, Line 28, delete "2, wt %," and insert --2 wt %,-- therefor

In Column 9, Line 23, delete "reagent." and insert --reagent:-- therefor

In Column 12, Line 35, delete "(FIG. 10," and insert --(FIG. 1*f*),-- therefor

In the Claims

In Column 18, Line 5, in Claim 1, after "comprising", insert --:--

In Column 19, Line 6, in Claim 19, after "comprising", insert --:--

In Column 19, Line 14, in Claim 20, after "comprising", insert --:--

Signed and Sealed this  
Eleventh Day of March, 2025

Coke Morgan Stewart  
*Acting Director of the United States Patent and Trademark Office*